(12) United States Patent
Densham et al.

(10) Patent No.: US 11,570,871 B2
(45) Date of Patent: Jan. 31, 2023

(54) SYSTEMS AND METHODS FOR TRACKING AND INTERACTING WITH ZONES IN 3D SPACE

(71) Applicant: CAST Group of Companies Inc., Toronto (CA)

(72) Inventors: Gilray Densham, Inglewood (CA); Matthew Cochrane, Toronto (CA); Robbins Kuriakose, Scarborough (CA); William McDaniel, Toronto (CA)

(73) Assignee: CAST Group of Companies Inc., Toronto (CA)

( * ) Notice: Subject to any disclaimer, the term of this patent is extended or adjusted under 35 U.S.C. 154(b) by 280 days.

(21) Appl. No.: 17/083,397

(22) Filed: Oct. 29, 2020

(65) Prior Publication Data

US 2021/0042019 A1 Feb. 11, 2021

Related U.S. Application Data

(63) Continuation of application No. 16/733,606, filed on Jan. 3, 2020, now Pat. No. 10,852,922, which is a (Continued)

(51) Int. Cl.
*G06K 9/00* (2022.01)
*H05B 47/125* (2020.01)
(Continued)

(52) U.S. Cl.
CPC .......... *H05B 47/125* (2020.01); *G05B 11/01* (2013.01); *G06F 3/011* (2013.01);
(Continued)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06K 9/00771; G06K 9/6202;
(Continued)

(56) References Cited

U.S. PATENT DOCUMENTS

| 7,787,009 B2 | 8/2010 | Alpaslan |
| 2010/0164862 A1* | 7/2010 | Sullivan .................. G06T 7/73 345/156 |

(Continued)

*Primary Examiner* — Duy M Dang
(74) *Attorney, Agent, or Firm* — Laurie Wright; Christopher N. Hunter; Blake, Cassels & Graydon LLP

(57) ABSTRACT

Systems and methods are provided for automatically controlling zone interactions in a three dimensional virtual environment. A computing device provides a graphical user interface (GUI) to assign zone attributes to a zone, which is a volume of space in the virtual environment. A virtual object is assigned to the zone, as well as an interaction and a responsive operation that follows the detected interaction. The virtual object's position in the virtual environment corresponds to a physical object's position in a physical environment. For example, when the computing system detects that the virtual object has entered or left the zone, according to an assigned interaction, then an assigned operation is executed to control a physical device in the physical environment.

26 Claims, 20 Drawing Sheets

Related U.S. Application Data continuation of application No. 15/866,281, filed on Jan. 9, 2018, now Pat. No. 10,552,014.

(60) Provisional application No. 62/444,536, filed on Jan. 10, 2017.

(51) Int. Cl.

| | | |
|---|---|---|
| *G06F 3/04842* | (2022.01) | |
| *G06T 7/292* | (2017.01) | |
| *G06F 3/04815* | (2022.01) | |
| *H04N 5/232* | (2006.01) | |
| *G06T 7/70* | (2017.01) | |
| *H04N 5/247* | (2006.01) | |
| *G06F 3/16* | (2006.01) | |
| *G05B 11/01* | (2006.01) | |
| *H04N 9/31* | (2006.01) | |
| *G06F 3/01* | (2006.01) | |
| *B25J 19/02* | (2006.01) | |
| *H05B 47/18* | (2020.01) | |
| *H05B 47/19* | (2020.01) | |

(52) U.S. Cl.
CPC ...... *G06F 3/04815* (2013.01); *G06F 3/04842* (2013.01); *G06F 3/165* (2013.01); *G06T 7/292* (2017.01); *G06T 7/70* (2017.01); *H04N 5/23296* (2013.01); *H04N 5/247* (2013.01); *H04N 9/31* (2013.01); *H04N 9/3185* (2013.01); *H04N 9/3194* (2013.01); *B25J 19/023* (2013.01); *G06T 2207/10016* (2013.01); *G06T 2207/30204* (2013.01); *H05B 47/18* (2020.01); *H05B 47/19* (2020.01)

(58) Field of Classification Search
CPC .......... G06K 9/00221; G06K 9/00335; G06K 9/00369; G06K 9/627; G06K 9/00718; G06K 9/6256; G06K 9/62; G06N 3/04; G06N 3/08; G06N 3/02; H04N 7/181; H04N 5/2226; G08C 17/00; G08C 17/02; G08B 13/196

See application file for complete search history.

(56) References Cited

U.S. PATENT DOCUMENTS

| | | |
|---|---|---|
| 2015/0120080 A1 | 4/2015 | Densham et al. |
| 2016/0196667 A1 | 7/2016 | Densham et al. |
| 2018/0196585 A1 | 7/2018 | Densham et al. |

\* cited by examiner

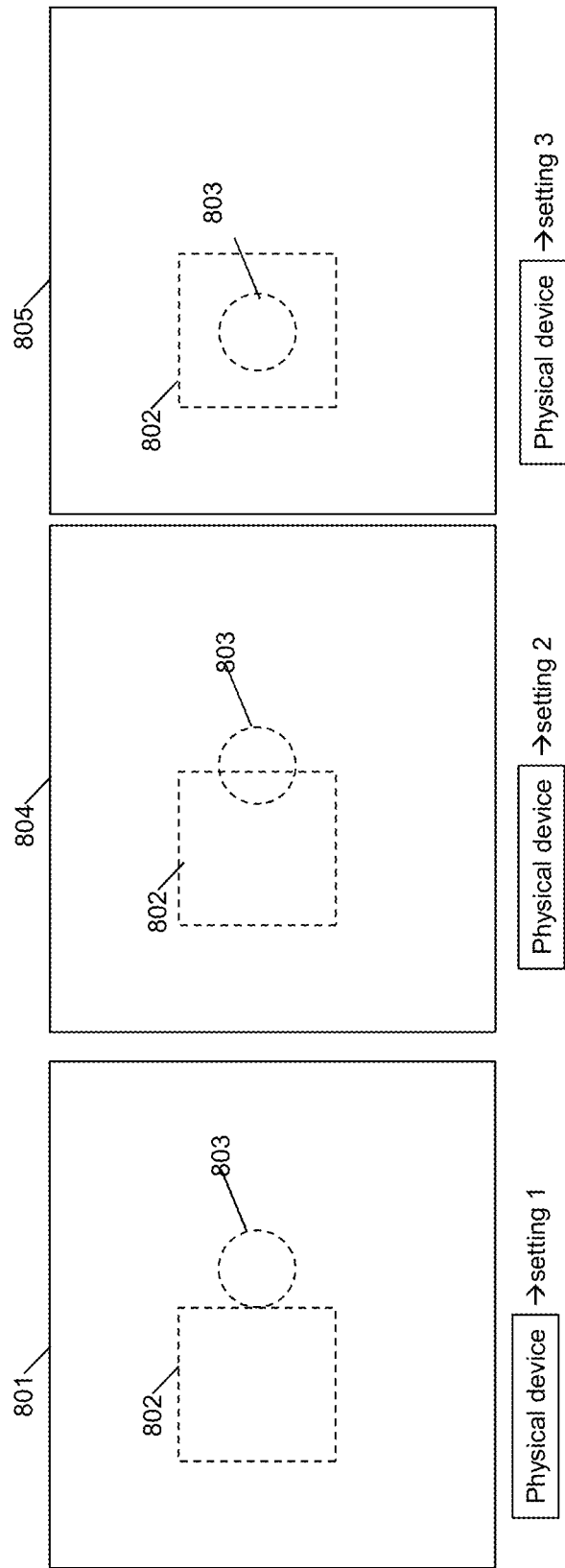

SYSTEMS AND METHODS FOR TRACKING AND INTERACTING WITH ZONES IN 3D SPACE

CROSS-REFERENCE TO RELATED APPLICATIONS

This application is a continuation of U.S. patent application Ser. No. 16/733,606 filed on Jan. 3, 2020 and titled "Systems and Methods For Tracking And Interacting With Zones in 3D Space", which is a continuation of U.S. patent application Ser. No. 15/866,281 filed on Jan. 9, 2018 and titled "Systems and Methods For Tracking And Interacting With Zones in 3D Space", which claims priority to U.S. Provisional Patent Application No. 62/444,536 filed on Jan. 10, 2017 and titled "Systems and Methods for Tracking and Interacting With Zones in 3D Space", and the entire contents of which are incorporated herein by reference.

TECHNICAL FIELD

The following relates generally to tracking and interacting with zones in three-dimensional (3D) space.

DESCRIPTION OF THE RELATED ART

There are various technologies for tracking objects in three dimensional (3D) space. Depending on the location of an object, a device may be triggered to respond to the object's location. For example, a robotic light can be triggered to turn on and shine on an object in some instances, while in other instances, the robotic light does not shine on the object. Managing the interaction between a device's response and an object's location can be technically challenging and a time-consuming process.

BRIEF DESCRIPTION OF THE DRAWINGS

Embodiments will now be described by way of example only with reference to the appended drawings wherein:

FIGS. 8a, 8b, and 8c show different examples of top views of two zones interacting with each other in different relative positions, and a physical device correspondingly set to different settings.

DETAILED DESCRIPTION

Figure 1:
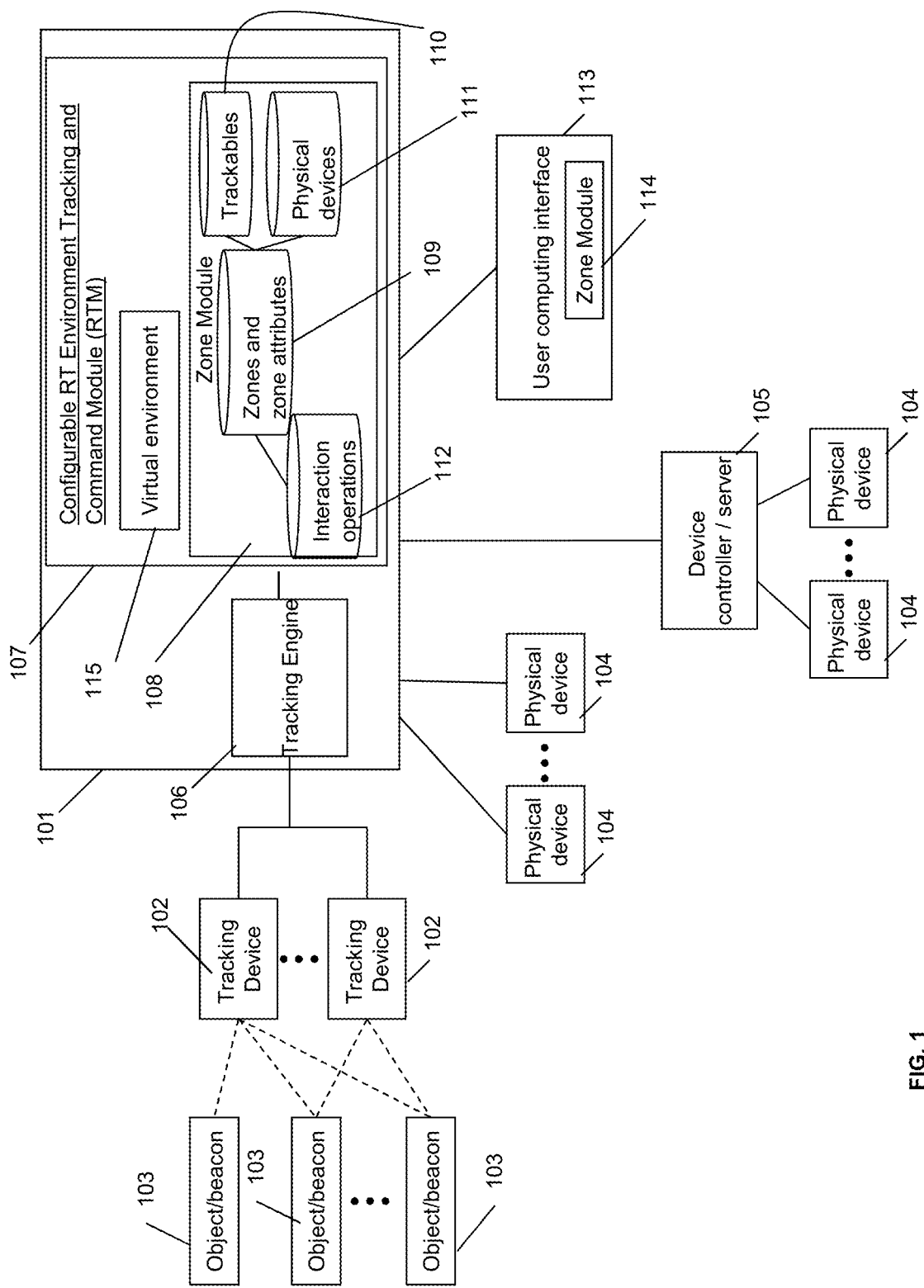
FIG. 1 is a schematic diagram of an example system for tracking and interacting with zones.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Turning to FIG. 1, an example system for tracking zones and managing the interaction of the zones is provided. The system includes a computing system 101 that is in data communication with various other devices, including one or more tracking devices 102, one or more physical devices 104, and a user computing interface 113. The computing system may also be in communication with a device controller or device server 105, which in turn controls other physical devices 104. The computing system may also be in communication with one or more beacons 103.

The one or more tracking devices 102 track at least the position of one or more objects or beacons 103. The beacons, for example, are active or passive devices that are attached to an object or a person in order to facilitate tracking of the object or person. In another example embodiment, the objects are tracked directly without a beacon. The objects or beacons, or both, that are being tracked by the tracking devices 102 are herein referred to as "trackables". In another aspect, the one or more tracking devices 102 also track the orientation of a given trackable, such as which direction a trackable is facing.

The data from the tracking devices 102 is transmitted to the computing system 101, which includes a tracking engine 106 and a configurable real-time environment tracking and command module (RTM) 107. The tracking engine 106 processes the data to output the position information (e.g. X,Y,Z coordinates or other type of coordinate system) and identifier information of the trackables. The tracking engine may also output other information such as orientation information of the trackables. The data outputted from the tracking engine 106 is used by the RTM 107 to determine the location of zones and trackables, and the interaction therebetween. For example, if a trackable enters space of a zone, then the RTM transmits data that invokes a physical device 104 to take a certain action. Alternatively, if a dynamic zone, which is a zone is associated with a trackable and moves with the trackable, interacts with another zone or another trackable, then the RTM transmits data that invokes a physical device 104 to take a certain action. The RTM 107 includes, amongst other things, a zone module 108 to manage these interactions.

In an example embodiment, the trackable is a beacon, and the beacon includes a light source that emits light (e.g. flashes light) in a pattern. The pattern corresponds to an identifier that uniquely identifies the beacon.

In another example aspect, either in addition or in the alternative, the beacon includes a wireless radio device that receives or transmits data, or both. The light emitted by the beacon, or the data transmitted by the wireless radio, or both, is received or detected by one or more of the tracking devices 102.

In another example aspect, the beacon also includes one or more inertial sensors, such one or more accelerometers to measure movement along the X, Y, Z axes. The inertial sensor may also include a gyroscope to measure angular rotation about the X, Y, Z axes.

In an example embodiment, the tracking devices 102 include cameras that capture digital image data, and the tracking engine 106 receives and processes the digital image data to determine the position of a given trackable. In another example embodiment, the tracking devices 102 include a wireless radio that receives and transmits data with a beacon.

Other types of beacons may be used to facilitate tracking, including beacons that emit or reflect a SONAR signal, a RADAR signal, an RFID signal, a WiFi signal, or other types of energy signals that may be detected by the one or more tracking devices 102. It will be appreciated that the beacons may emit or reflect, or both, different combinations of energy signals. The tracking devices are accordingly configured to detect the respective energy signal from these beacons.

It will be appreciated that other currently known and future known devices and technologies for tracking the position of an object and the orientation of an object in 3D space may be used with the principles described herein.

It will also be appreciated that various types of data may be acquired by the tracking devices 102 and the tracking engine 106 uses the data to determine the position of an object, and optionally the orientation of the object. In a preferred embodiment, the tracking devices 102 and the tracking engine 106 simultaneously track multiple trackables.

In an example embodiment, the computing system 101 includes one or more server machines. In particular, the computing system includes one or more processors, hardware memory devices, and one or more communication devices to communicate with the tracking devices 102, the physical devices 104, the device controller or server 105, or the user computing interface 113, or combinations thereof. In an example embodiment, the computing system 101 communicates wirelessly with the other components. In another example embodiment, the computing system 101 communicates transmits data over a wired network to the other components.

In an example embodiment, the tracking engine 106 resides on one or more server machines and the RTM 107 resides on a different one or more server machines. In another example embodiment, the tracking engine 106 and the RTM 107 reside on the same server machine.

In an example embodiment, the computing system 101 is physically located in the same vicinity as the tracking devices 102, the physical devices and the user computing interface 113. In an alternative example, the computing system 101 is a physically distributed computing system that is interconnected by the Internet.

The RTM 107 includes a database of virtual objects that are used to create a virtual environment 115. A virtual object, for example, a 3D model of an object that can be displayed via a graphical user interface (GUI) on a display screen. The virtual environment is modeled after a physical environment, and therefore the virtual objects in the virtual environment correspond to physical objects in the physical environment. As physical objects, which are being tracked by the tracking engine 106, move or rotate (or both), the corresponding virtual object in the virtual environment in the RTM 107 also move or rotate (or both) in the same way. Further example details about the RTM 107 are described with respect to FIG. 17.

The RTM 107 also includes a zone module 108 that generates and positions zones within the virtual environment. A zone is a 3D space in a physical environment, and a corresponding virtual zone is generated in the virtual environment. The zone in the physical environment may not have markings that define the boundary of the zone. In another example embodiment, markings in the physical environment define the boundary of the zone. In the virtual environment, the corresponding zone boundaries are marked and displayed overlaid the virtual environment.

Static zones are herein used to refer to zones that do not move in the physical environment and the virtual environment. Dynamic zones are herein used to refer to zones that automatically move in the physical environment and the virtual environment. For example, a given dynamic zone is associated with a trackable, and as the trackable moves, so does the given dynamic zone. As many of the example features described herein are applicable to both static and dynamic zones, in many of the examples described below, the term "zone" is generally used.

The zone module 108 includes a zones and zone attributes database 109, a trackables database 110, a physical devices database 111 and an interaction operations database 112.

The zones and zone attributes database 109 stores information about a zone. Each zone is identified by a zone ID and is associated with a number of zone attributes. Examples of these attributes include spatial dimensions and shape, position information, and other data. The zone attributes may also specify whether the zone is a static zone or a dynamic zone. Another example of a zone attribute is a time range in which a given zone is active (e.g. responsive to an interaction event). A given zone in the database 109 is also associated with data in the trackables database 110, the physical devices database 111 and the interaction operations database 112.

The trackables database 110 includes data about trackables (e.g. trackable ID, position, orientation, etc.). The physical devices database 111 includes data about physical devices (e.g. physical device ID, operational attributes of the physical device, communication protocols, etc.). The interaction operations database 112 includes data (e.g. executable instructions) that identify actions for one more physical devices when a given zone interacts with another trackable, or another zone, or the absence of interaction with the given zone is detected, or combinations thereof.

For static zones, a given static zone in the database 109 is associated with one or more trackables from the database 110, one more physical devices from the database 111, and one or more interaction operations 112. For example, when a trackable moves into the space defined by the given static zone, the computing system 101 determines how a given corresponding physical device is to react to the detected interaction, and consequently invokes the physical device to react.

For dynamic zones, a given dynamic zone is associated with a first trackable from the database 110. In other words, as the first trackable moves, so does the given dynamic zone. In an example embodiment, the dynamic zone encompasses the first trackable. If another trackable or another zone moves into the space of the given dynamic zone, then the computing system 101 determines how a given corresponding physical device is to react to the detected interaction, and consequently invokes the physical device to react.

The relationships in the zone module 108 between a given zone and one or more trackables, one or more physical devices and one or more interaction operations are considered zone attributes of the given zone.

The user computing interface 113 is, for example, a computing device with a display screen (or other display apparatus) and user input devices. Examples of user input devices include a mouse, a keyboard, a touch pad, and a touch screen. Non-limiting example embodiments of user computing interfaces include a laptop, a desktop computer, a mobile device, a tablet, a virtual reality display device, etc. The virtual environment 115 is displayable on the user computing interface 113 and a GUI is provided for a user to construct the zones in the virtual environment. The user may also use the GUI to define zone attributes.

It will be appreciated that while many of the examples described herein relate to real-time tracking in a venue (e.g. a movie set, a stage, a theater, etc.), the systems and the methods are applicable to other contexts. For example, the tracking of zones and objects, and the management of zones can be used in warehouses that have robots and people working together. The systems and methods described herein are also applicable to hospitals and healthcare buildings, in which people, devices and certain areas are being tracked. The systems and methods described herein are also applicable to sports, in which people and certain areas are being tracked. It will be appreciated that the physical devices 104 will vary by the context in which the systems and methods are applied.

Figure 2:
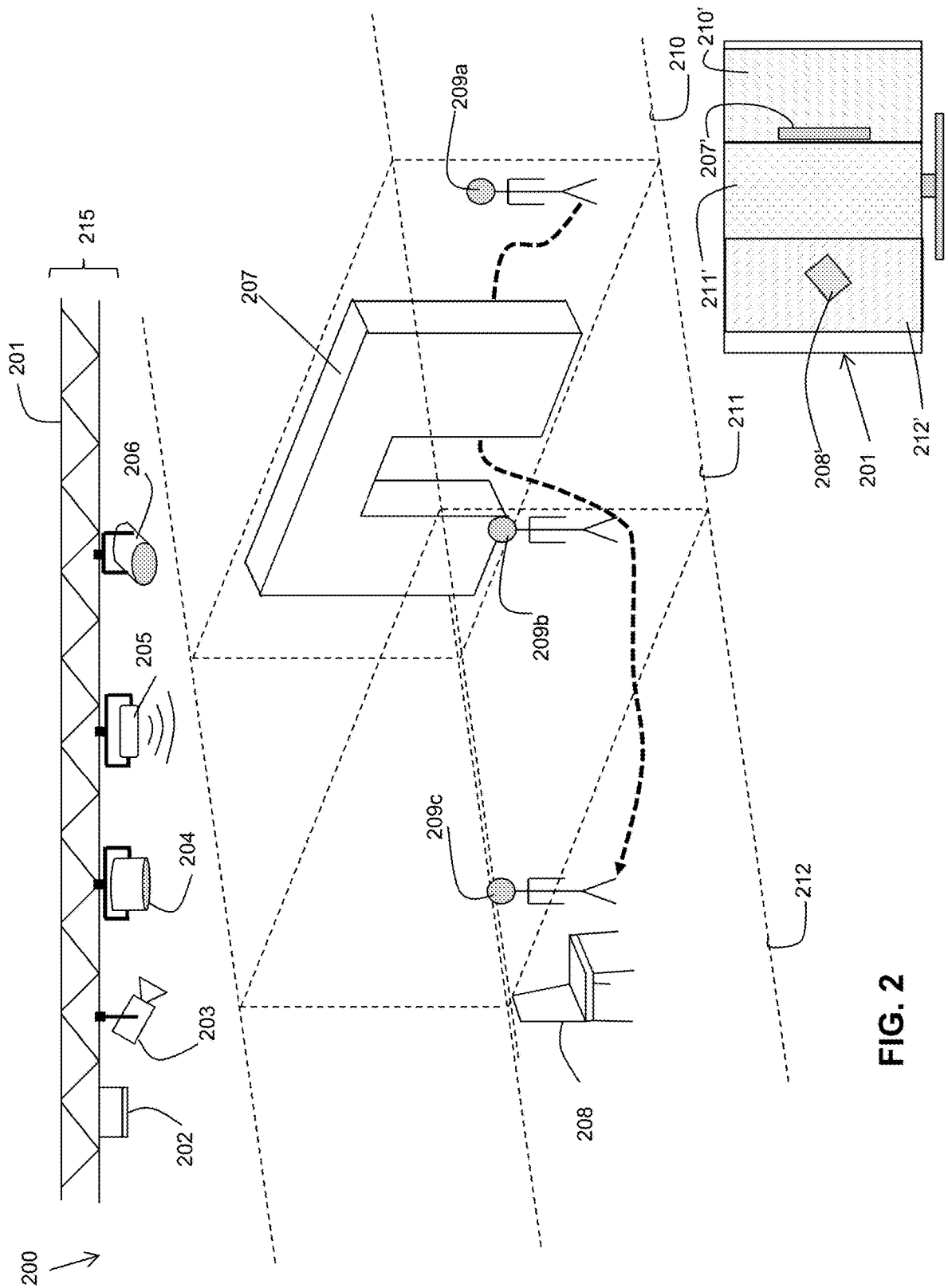
FIG. 2 is an example of a physical environment with illustrations of static zones overlaid the physical environment, and a display screen showing a top view of a virtual environment corresponding to the physical environment.

Turning to FIG. 2, an example of a physical environment 200 is shown, and a corresponding virtual environment 201 is also shown on a display screen. The view of the virtual environment 201 is shown from a top view and it includes virtual objects that correspond to physical objects in the physical environment.

The physical environment 200 is, for example, a stage setting with an overhead system 215 that includes a truss 201 that supports a number of physical devices. These physical devices include a dispenser 202 (e.g. dispenses fog, confetti, water or other material), a robotic camera 203, a robotic light 204, a sound speaker 205, and another robotic light 206. In some examples, these devices are able to move by rotation or linear translation, or both. Robotic cameras can have their zoom setting adjusted. Robotic lights can have many parameters adjusted. It will be appreciated that the different adjustable parameters of these physical devices depends on the adjustable features of a given physical device. The computing system 101 is able to initiate one or more of these physical devices to perform an action, which includes changing or adjusting on or more of these adjustable parameters or adjustable features.

The physical environment 200 also includes a doorway 207, a chair 208 and a person moving between multiple positions 209a, 209b, and 209c. Overlaid the physical environment are a first zone 210, a second zone 211, and a third zone 212. These zones are not marked in physical environment 200, but are illustrated with dotted lines for clarity of explanation. These zones, for example, are rectangular prisms. However, other shapes may be used to define the zones.

In the virtual environment 201, the corresponding first virtual zone 210', the corresponding second virtual zone 211' and the corresponding third virtual zone 212' are shown. The virtual environment also includes a virtual doorway 207' that corresponds to the physical doorway 207, and virtual chair 208 that corresponds to the physical chair 208'. The zones are created, for example, by a user using the GUI to create a rectangular prism or some other shape, and then dragging the shape to desired position within the virtual environment.

The tracking engine 106 tracks the physical position of the person in the physical environment 200, and the RTM 107 updates the virtual environment 201 to show the position of the person.

In an example embodiment, when the person is at position 209a in the first zone 210, the computing system causes the sound speaker 205 to play a first audio content (e.g. first sound track). When the computing system 101 detects that the person is at position 209b in the second zone 211, the computing system triggers the sound speaker 205 to play a second audio content (e.g. a second sound track). Further, when the computing system detects that the person is in the second zone, the computing system triggers the robotic camera to start filming and tracking the position of the person. When the computing system detects that the person is at the third position 209c in the third zone, the computing system stops the robotic camera from filming and tracking the person, and causes the dispenser 202 to dispense the material.

Figure 3:
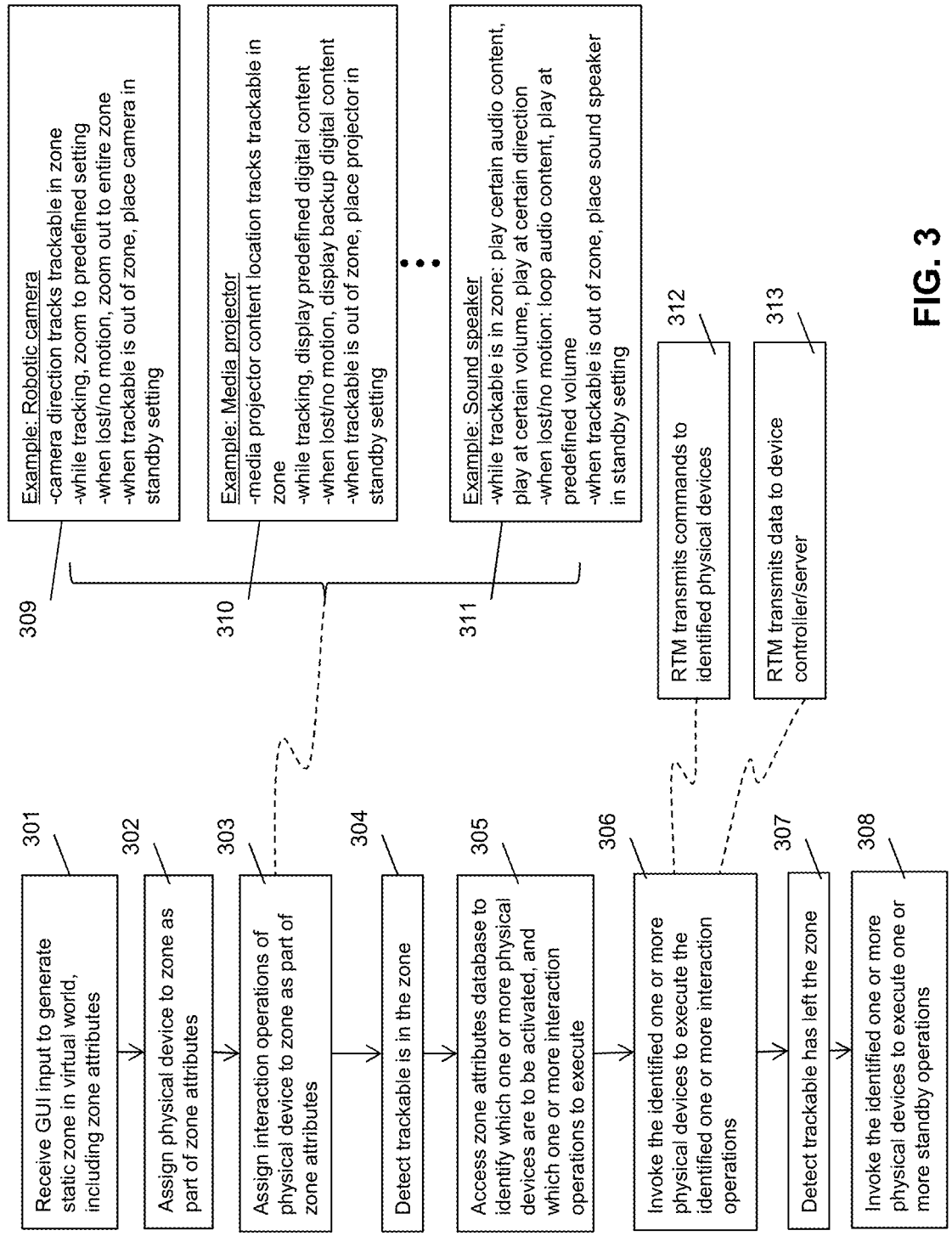
FIG. 3 is a flow diagram illustrating example computer executable instructions for generating a zone and zone attributes, and invoking a physical device to respond to an interaction between a trackable object and the zone.

Turning to FIG. 3, example executable instructions are provided to generate and manage the interaction with a static zone.

At block 301, the computing system 101 receives a GUI input to generate a static zone in a virtual world, including zone attributes. For example, via the GUI, a person can graphically draw a shape within a virtual environment which defines the 3D boundaries of the zone in both the virtual environment and the physical environment. In other words, the zone's shape, size and position can be generated via a GUI.

At block 302, the computing system 101 assigns one or more physical devices to the zone as part of the attributes. Therefore, when a trackable comes into the zone, the assigned one or more physical devices are automatically activated in a predefined manner.

In particular, at block 303, the computing system assigns interaction operations of the physical device to the zone as part of the zone attributes.

For example, at block 309, the physical device is a robotic camera. When a trackable is in the zone, the computing system automatically causes the robotic camera to track the trackable in the zone. Furthermore, while tracking the trackable in the zone, the computing system outputs a command that causes the robotics camera to film the trackable at a certain zoom or magnification setting. Another assigned interaction operation stored in memory is that, when the trackable is no longer detectable in the zone (e.g. lost in the zone) or is not moving within the zone, the computing system sends a command to cause the robotic camera to zoom out and to film the entire zone. For example, the trackable is no longer trackable in the zone due to a signal error or an occlusion between the tracking device 102 and the trackable (e.g. object/beacon 103). Furthermore, when the computing system detects that the trackable has exited the zone, then the computing system automatically places the camera into a standby setting. For example, in the standby setting, the robotic camera is oriented to point at a predefined standby position. The predefined standby position, for example, is within the zone.

At block 310, other examples of interaction operations are provided for a media projector being automatically triggered in response to a trackable moving into a zone. A media projection is an example of a physical device, and it is able to project light to visually display digital content (e.g. video, pictures, text, etc.). A media projector is also called a video projector and can display digital content at various pixel resolutions. An example operation is the computing system outputting data to cause the media projector to project an image at the same location as the trackable, when the trackable is in the zone. Another example is that, when the trackable is in the zone, then the computing system outputs data to cause the media projector to play or display predefined digital content for that particular zone. When the trackable is in a different zone, then the media projector displays different predefined digital content. When the computing system detects that the trackable in the given zone is lost or is not moving, then the computing system outputs data that causes the media projector to display backup digital content. When the trackable moves out of the zone then the media projector is placed into a standby setting. For example, the media projector turns off, or displays standby digital content.

At block 311, examples of interaction operations are provided for a sound speaker system being automatically triggered by the computing system in response to a trackable moving into a zone. The sound speaker system may include one or multiple sound speakers. One or more of the sound speakers may be placed on robotic mounts, able to move or re-orient a given speaker. The sound speaker system is an example of a physical device. As per block 311, when the computing system detects that the trackable in the zone, the computing system outputs data that causes the sound speaker system to play certain audio content, or play the audio content at a certain volume, or play the audio content from certain direction, or combinations thereof. When the trackable is detected to be lost within the zone, or has stopped moving in the zone for a certain amount of time, then the computing system outputs data that causes the sound speaker system to play certain audio content (e.g. loop or replay recently played audio content), or to play audio content at another predefined volume, or both. When the trackable is detected to move out of the zone, the computing system outputs data that causes the sound speaker system to be put in a standby setting. The sound speaker system's standby setting could be off, or could affect one or more settings relating to any one or more of the volume, the audio content and the direction from which the sound originates. The direction of the sound may be controlled by determining which sound speaker in the system plays the audio content, as there can be multiple sound speakers placed at different positions. The direction of the sound may also, in the alternative or in addition, be controlled by causing a sound speaker on a robotic mount to swivel or rotate in a certain orientation.

It will be appreciated that different interaction operations may be assigned to a zone, depending on the operations of the physical device. Other types of physical devices include robotic vehicles, drones (also called unamend aerial vehicles), robotic arms, control devices to control electrical power, electromechanical apparatuses, machinery, etc.

Continuing with FIG. 3, at block 304, the computing system 101 detects that a trackable is in the zone. At block 305, the computing system accesses the zone attributes database 109 to identify which one or more physical devices are to be activated, and which one or more interaction operations are to be executed. The computing system makes the identification based on the previously made assignments at blocks 302 and 303.

At block 306, the computing system 101 outputs data that invokes or causes the identified one or more physical devices to execute the identified one more interaction operations. For example, the computing system transmits commands to the identified one or more physical devices. Or, in another example, the computing system transmits data to a device controller or server, and that device controller or server uses the data to generate and transmit commands to a physical device.

At block 307, the computing system 101 detects that the trackable has left the zone. At block 308, the computing system invokes the one or more identified physical devices to execute one or more standby operations.

Figure 4A:
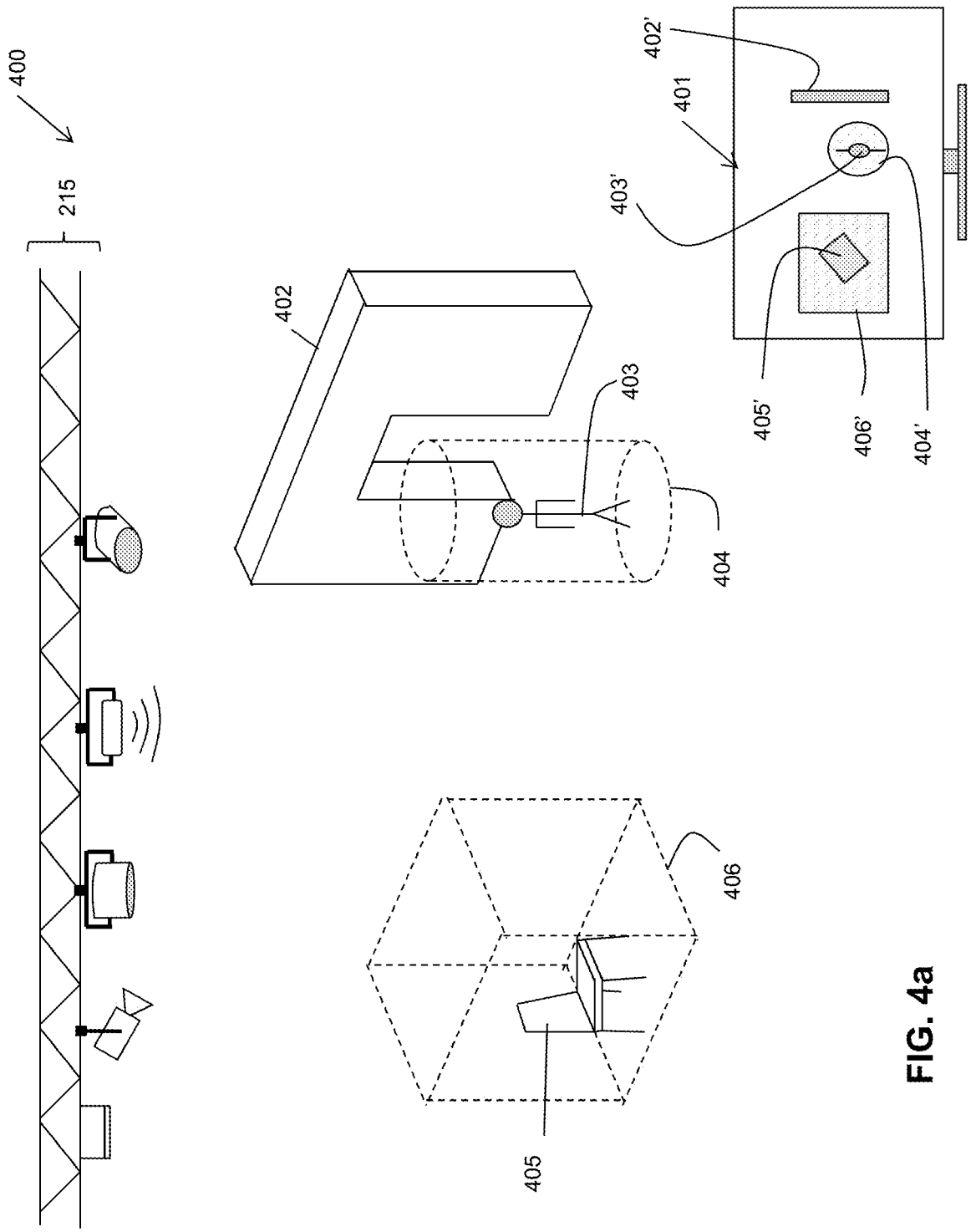
FIG. 4a is an example of a physical environment with illustrations of a static zone and a dynamic zone overlaid the physical environment, and a display screen showing a top view of a virtual environment corresponding to the physical environment.
Figure 4B:
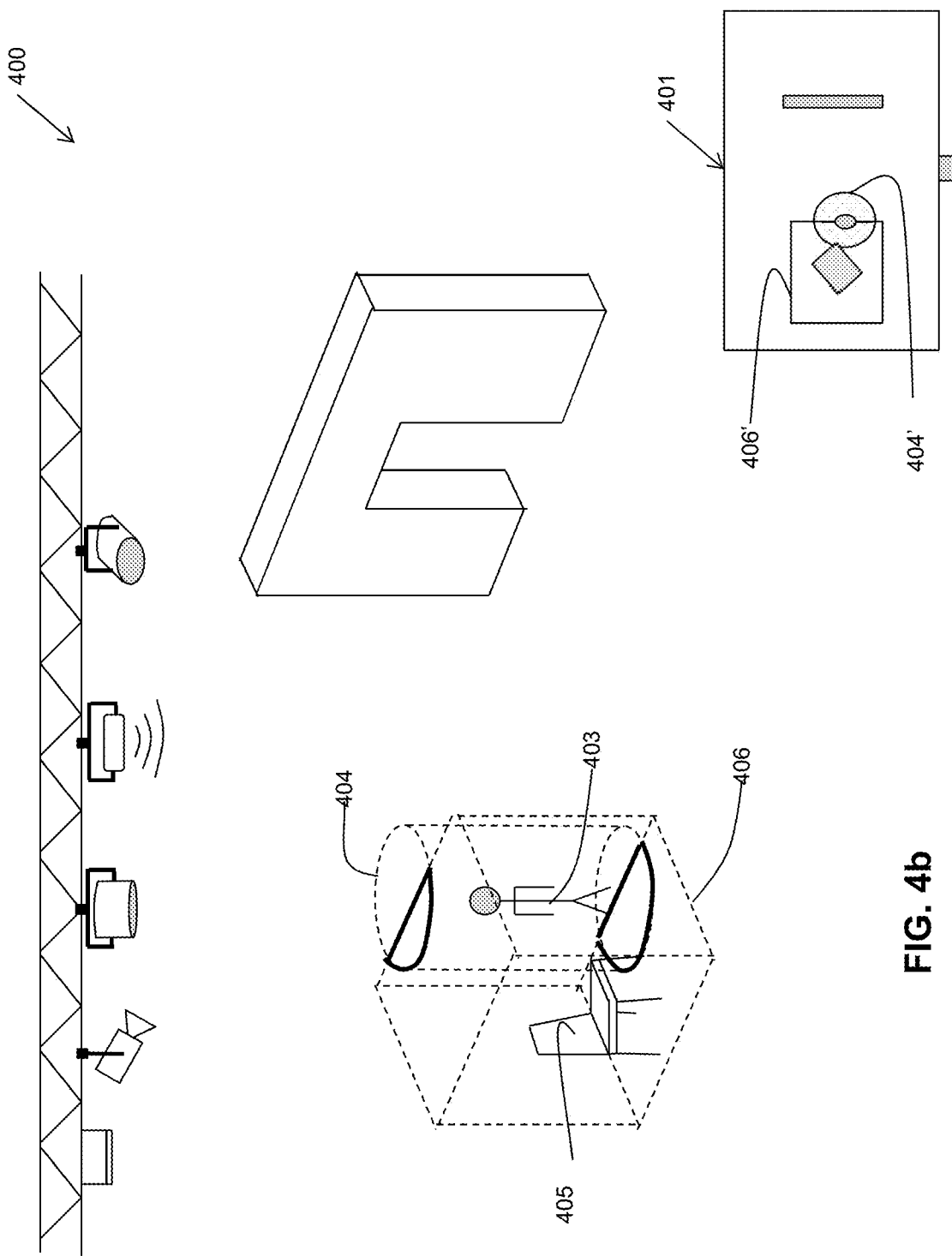
FIG. 4b shows a subsequent instance of FIG. 4a, with the static zone and the dynamic zones interacting with each other.

Turning to FIGS. 4a and 4b, a physical environment shows a person 403 and a chair 405 in an initial position (see FIG. 4a), and then shows the person 403 and the chair 405 in a subsequent position (see FIG. 4b).

The physical environment 400 also includes a doorway 402. In the virtual environment 401, which shows a top view, the virtual doorway 402 is shown. Corresponding to the physical person and the chair are the virtual person 403' and the virtual chair 406'. A dynamic zone 404 is associated with the person 403, who is a trackable. The virtual dynamic zone 404' is also shown in the virtual environment. The dynamic zone 404' surrounds the virtual person 403' and, correspondingly the dynamic zone 404 surrounds the person 403. As the person 403 moves, as being tracked by the tracking engine, so does the virtual person 403' and the virtual dynamic zone 404' in the virtual environment 401. In turn, the effect of the dynamic zone 404 also moves in the same way as the virtual dynamic zone 404'.

There is also a virtual static zone 406', which corresponds to the static zone 406.

As shown in FIG. 4*b*, when the person 403 moves to the zone 406, the dynamic zone 404 overlaps with the zone 406. The overlap is highlighted with bold lines in FIG. 4*b*. Correspondingly, the virtual environment 401 is updated and the virtual dynamic zone 404' is shown to overlap the virtual zone 406'. It will be appreciated that the person 403 may or may not be within the zone 406, but the dynamic zone 404 may still overlap the zone 406. When this occurs, the computing system 101 outputs data that causes a physical device (e.g. a robotic light, a robotic camera, a sound system, a dispenser, etc.) to perform a certain action. The certain action may be directed at the dynamic zone 404. For example, the robotic camera is oriented and is activated to film or record the dynamic zone 404. In another example, either in the alternative or in addition, a robotic light is directed to shine a light on the person 403, which in the center of the dynamic zone 404.

Figure 5A:
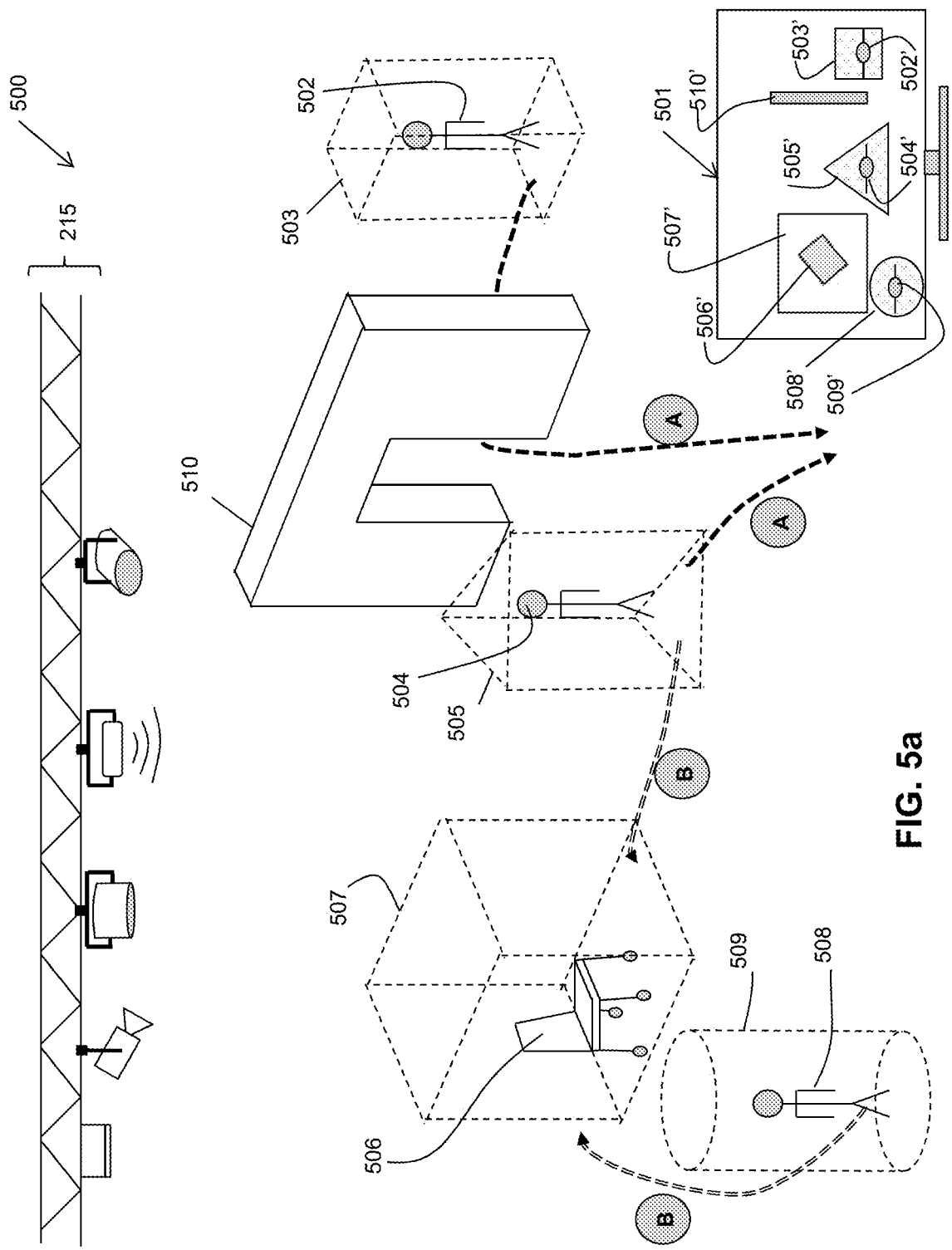
FIG. 5a is an example of a physical environment with illustrations of dynamic zones overlaid the physical environment, and a display screen showing a top view of a virtual environment corresponding to the physical environment.
Figure 5B:
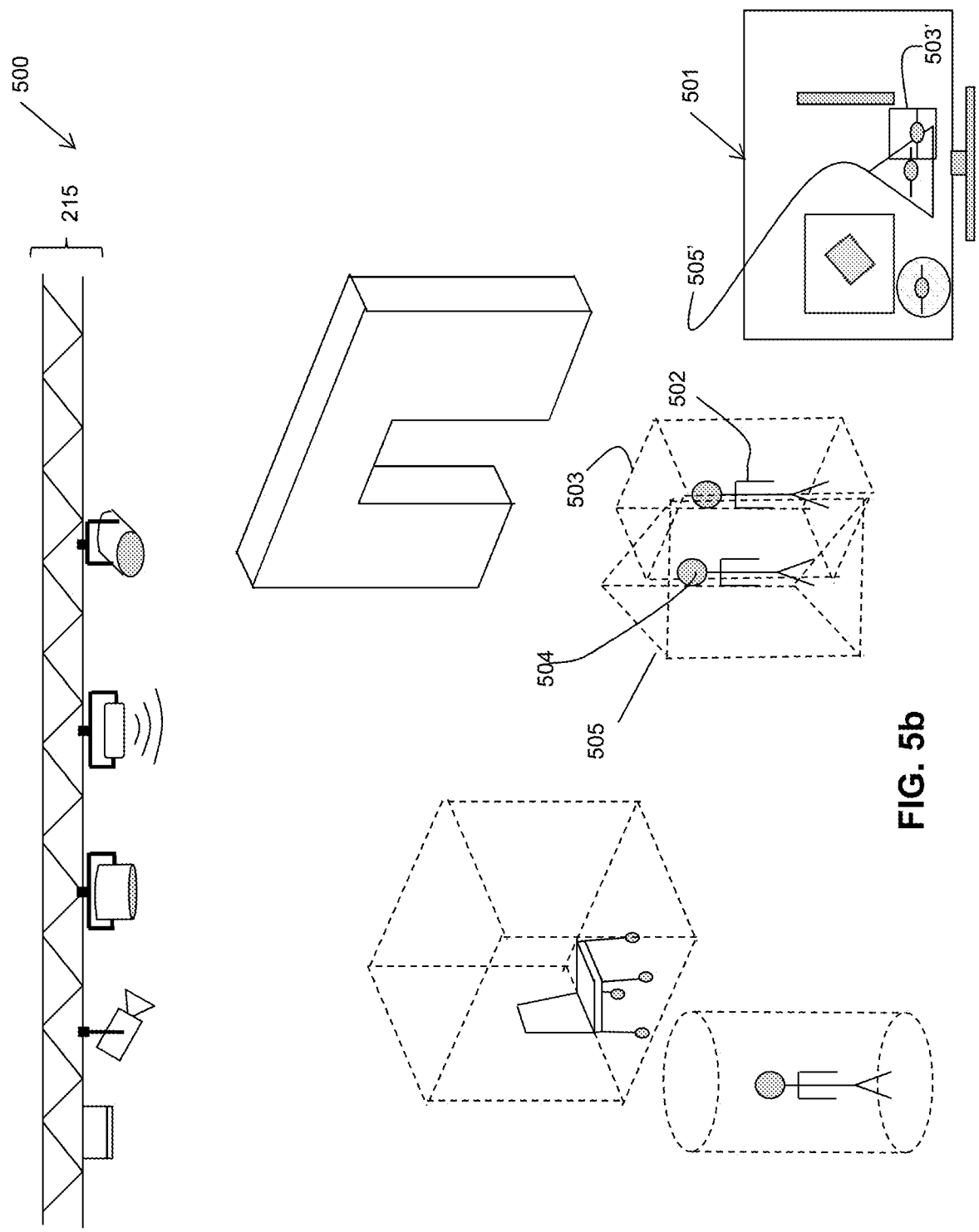
FIG. 5b shows an example of a subsequent instance of FIG. 5a, with a first set of dynamic zones interacting with each other.
Figure 5C:
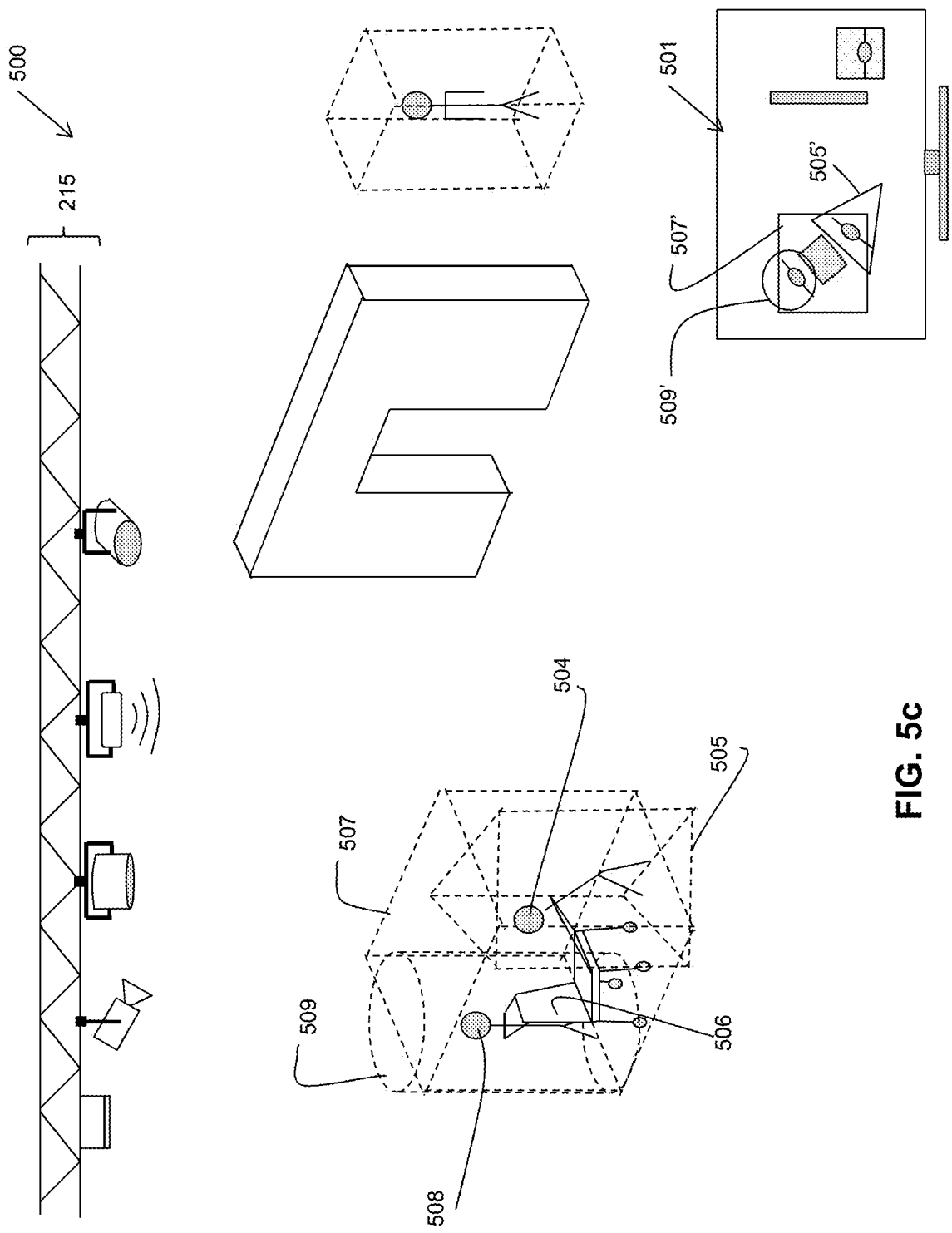
FIG. 5c shows an example of a subsequent instance of FIG. 5a, with a second set of dynamic zones interacting with each other.

Turning to FIGS. 5*a*, 5*b*, 5*c*, another physical environment 500 is shown, and a corresponding virtual environment 501 is shown from a top view. FIG. 5*a* shows objects in a first position and FIG. 5*b* shows the objects in a subsequent position. FIG. 5*c* shows objects in an alternative subsequent position.

Physical objects include a doorway 510, a first person 502, a second person 504, a chair 506, and a third person 508. The corresponding virtual objects are also shown in the virtual environment 501, such as the virtual doorway 510', the virtual first person 502', the virtual second person 504', the virtual chair 506', and the virtual third person 508'.

Also shown in the virtual environment 501 are the virtual dynamic zones. The virtual dynamic zone 503' is assigned to the first person's virtual representation 502', whereby the first person 502 is a trackable. The virtual dynamic zone 505' is assigned to the second person's virtual representation 504', whereby the second person 504 is a trackable. The virtual dynamic zone 507' is assigned to the chair's virtual representation 506', whereby the chair 506 is a trackable. The virtual dynamic zone 509' is assigned to the third person's virtual representation 508', whereby the third person 508 is a trackable. Representations of the dynamic zones 503, 505, 507, and 509 in the physical environment 500, which actually do not appear, are illustrated in the figures in dotted lines.

As shown by the movement lines A in FIG. 5*a*, the first person 502 and the second person 504 come together. In FIG. 5*b*, as the virtual dynamic zones 503' and 505' intersect with each other, which causes the computing system 101 to output data that affects one or more physical devices. For example, a robotic light is commanded to generate a spot light that is sized to cover the area of both dynamic zones 505' and 503'. In another example, a robotic camera is commanded to film an area that covers both dynamic zones 505' and 503'. In another example, a first robotic light is commanded to shine a first light on the first person 502, and a second robotic light is commanded to shine a second light on the second person 504.

Alternatively, as shown by the movement lines B in FIG. 5*a*, the second person 504 and the third person 508 are positioned at opposite ends of the chair 506, as subsequently shown in FIG. 5*c*. As per FIG. 5*c*, the dynamic zones 509 and 505 do not touch or overlap. However, the dynamic zones 509 and 507 overlap, and the dynamic zones 507 and 505 overlap. The computing system 101 detects this arrangement of the virtual zones 509', 507' and 505' in the virtual environment 501, and the computing system in turn outputs data to cause a physical device to respond in a certain way. For example, a robotic camera is activated to capture the field of view that encompasses all the zones 509, 507 and 505. In another example, a dispenser is activated to release material.

It will be appreciated that different responses for one or more physical devices may be triggered for different detected scenarios, such as when (1) dynamic zones 509 and 505 intersect; (2) dynamic zones 509 and 507 intersect only; (3) dynamic zones 507 and 505 intersect only; and (4) dynamic zones 509 and 507 intersect and dynamic zones 507 and 505 intersect.

Figure 6:
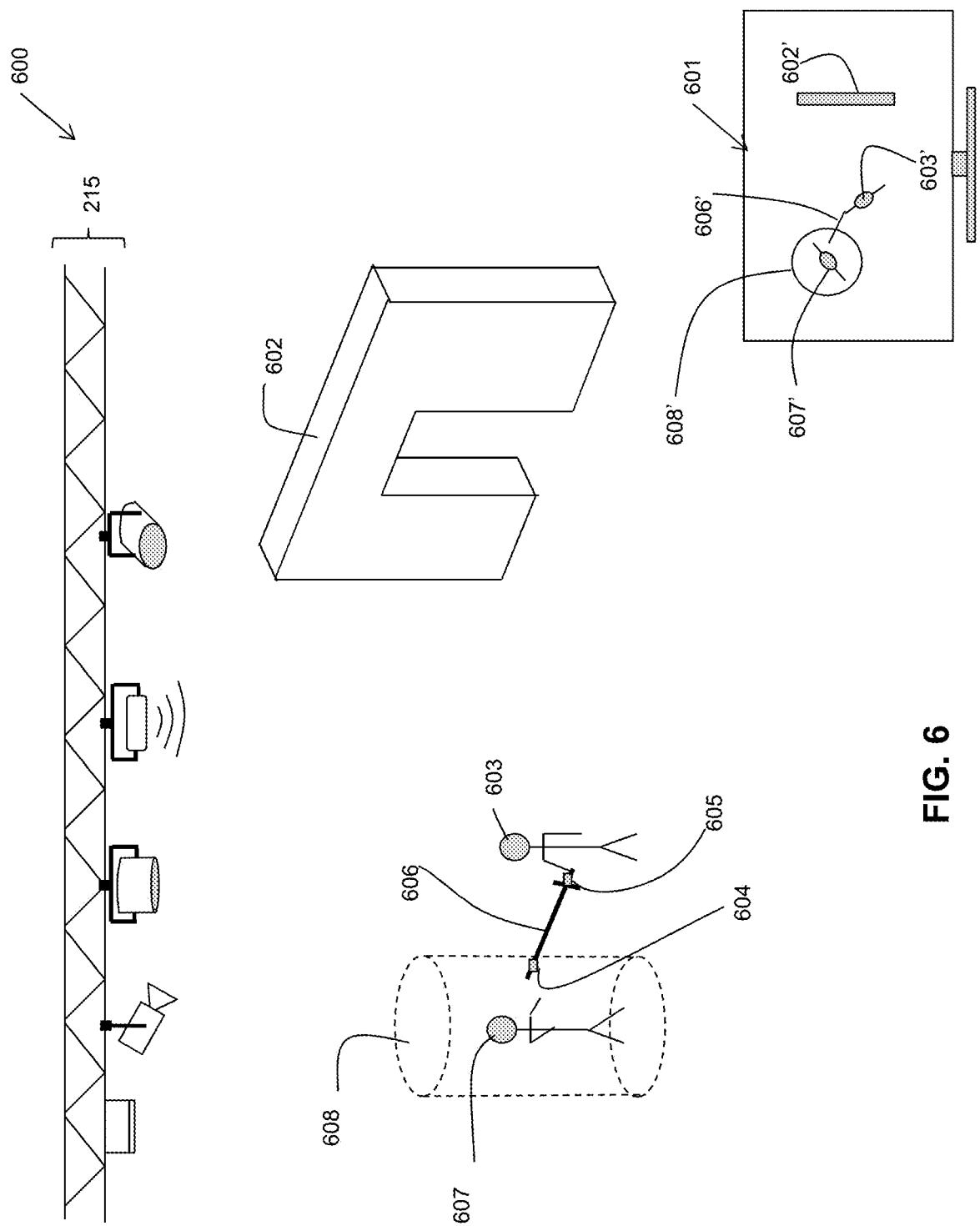
FIG. 6 is an example of a physical environment with illustrations of a dynamic zone and a trackable object interacting with each other, and a display screen showing a top view of a virtual environment corresponding to the physical environment.

Turning to FIG. 6, a physical environment 600 is provided, and it includes a doorway 602, a first person 607 and a second person 603. The first person and the second person are both trackables. The second person is holding a sword 606, or some other object, and it has mounted thereon beacons 604 and 605 on or near its ends. These beacons are trackables. As a result, the virtual environment 601 correspondingly shows, from a top view, the corresponding virtual objects 602', 603', 606', 607'.

A virtual dynamic zone 608' is assigned to the first person's virtual representation 607'. The outline of the dynamic zone 608 is illustrated around the first person 607 in the physical environment for clarity of explanation. The beacon 604 on the object 606 is positioned within, or interacts with, the dynamic zone 608. This is shown in the virtual environment 601.

When the computing system 101 detects such an event of a trackable (e.g. the beacon 604) interacting with a dynamic zone (e.g. the zone 608 and its virtual representation 608'), then the computing system outputs data that invokes a physical device to respond. For example, the speaker system plays an alarming sound, or lights flash red, or the camera zooms into the beacon 604 (e.g. the tip of the sword), or combinations thereof.

Figure 7:
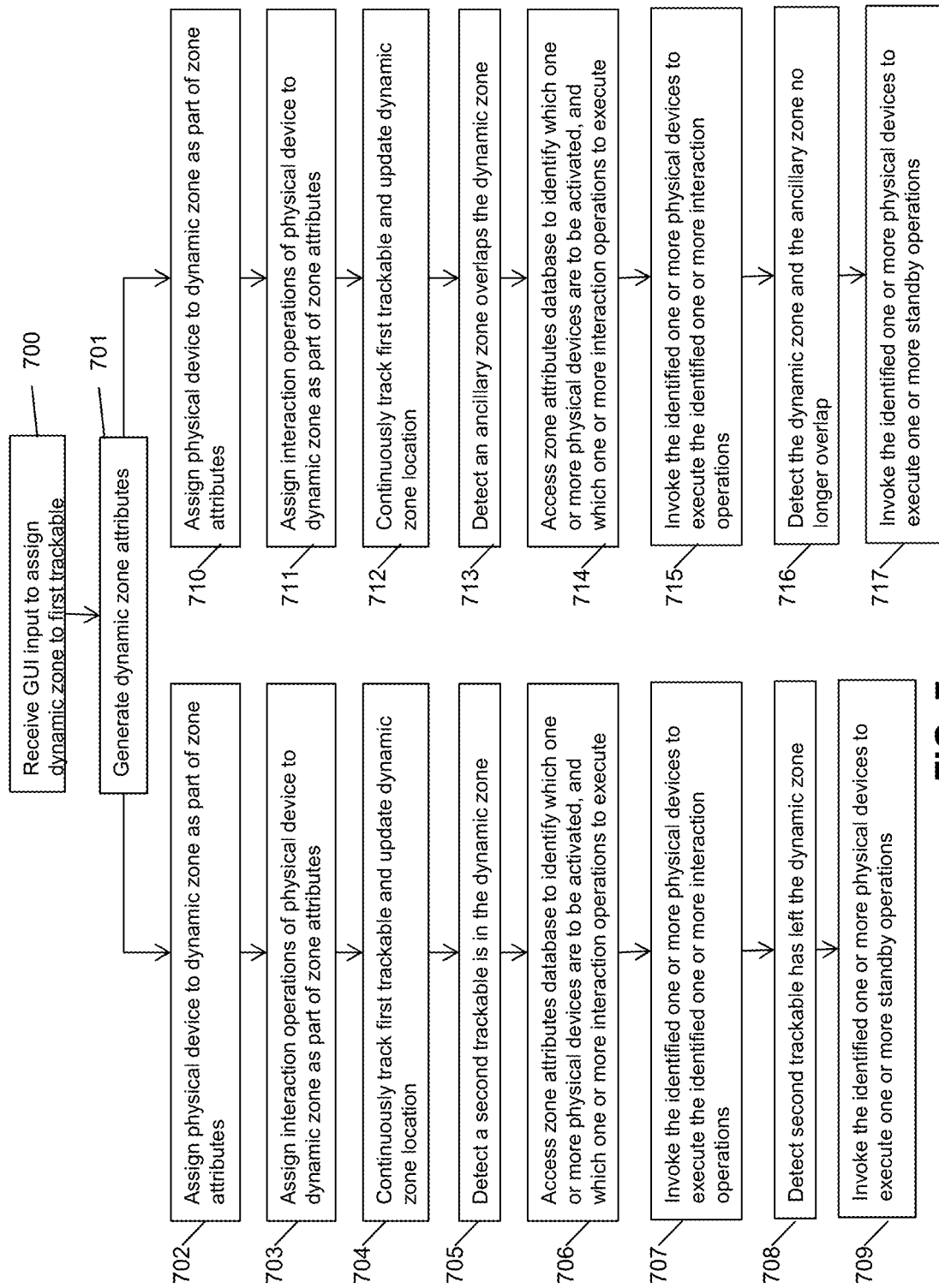
FIG. 7 is a flow diagram illustrating example computer executable instructions for generating a dynamic zone and zone attributes, and invoking a physical device to respond to an interaction with the dynamic zone.

FIG. 7 provides example computer executable instructions for generating and managing dynamic zones.

At block 700, a computing system 101 receives input via a GUI to assign a dynamic zone to a first trackable. At block 701, the computing system generates dynamic zone attributes. Non-limiting examples of these attributes include the shape of zone, the size of the zone, and where the zone is positioned relative to the trackable. For example, the dynamic zone may be positioned to be centered at the centroid of the trackable. The dynamic zone may be positioned to be offset from the centroid of the trackable. In an example embodiment, an existing static zone (e.g. called 'Mary's House') is converted into a dynamic zone. In other words, the shape and dimensions of the static zone become the shape and dimension of the dynamic zone. In another example, the rules associated with the static zone (e.g. for triggering other devices to execute an action) are applied to the dynamic zone. The dynamic zone may be set to control physical devices when the motion of the trackable is lost.

Blocks 702 to 709 related to managing an interaction between a trackable and a dynamic zone. At block 702, the computing system 101 assigns one or more physical devices to the dynamic zone as part of the zone attributes. At block 703, the computing system assigns interaction operations of the one or more physical devices to the dynamic zone as part of the zone attributes. These assignments may be done automatically, for example as a default setting, or may be assigned by a user via a GUI on the user computing interface 113.

At block 704, the computing system 101 continuously tracks the first trackable and updates the dynamic zone location in the virtual environment. At block 705, the computing system detects that a second trackable is in the dynamic zone. At block 706, the computing system accesses the zone attributes database to identify which one or more physical devices are to be activated, and which one or more interaction operations are to be executed. At block 707, the computing system outputs data that invokes the identified one or more physical devices to execute the identified one or more interaction operations.

At block 708, the computing system 101 detects that the second trackable is no longer within the dynamic zone. Responsive to this detection, the computing system invokes the identified one more physical devices to execute one or more standby operations (block 709).

Blocks 710 to 717 are similar to blocks 702 to 709, but are directed to a dynamic zone interacting with another zone, whether a dynamic zone or a static zone. Blocks 710, 711, and 712 are similar to blocks 702, 703 and 704. At block 713, the computing system 101 detects that an ancillary zone has overlapped the dynamic zone. Following blocks 713, are blocks 714 and 715, which are similar to blocks 706 and 707. At block 716, the computing system detects that the dynamic zone and the ancillary zone no longer overlap. Therefore, responsive to this detection, the computing system invokes the identified one more physical devices to execute one or more standby operations (block 717).

Turning to FIGS. 8a, 8b, and 8c, a series of circumstances 801, 804 and 805 are shown of two zones 802 and 803. In another example embodiment, only 802 is a zone and 803 represents a trackable. As the zone 804 moves further within the zone 802, the physical device's responsive setting varies as well. In other words, there is a relationship between the relative position or interaction of zones 802, 803, and the physical device setting. For example, for scenario 801, a controllable light is set to a first brightness setting; for scenario 804, the controllable light is set to a second brightness setting; and for scenario 805, the controllable light is set to a third brightness setting.

Figure 9:
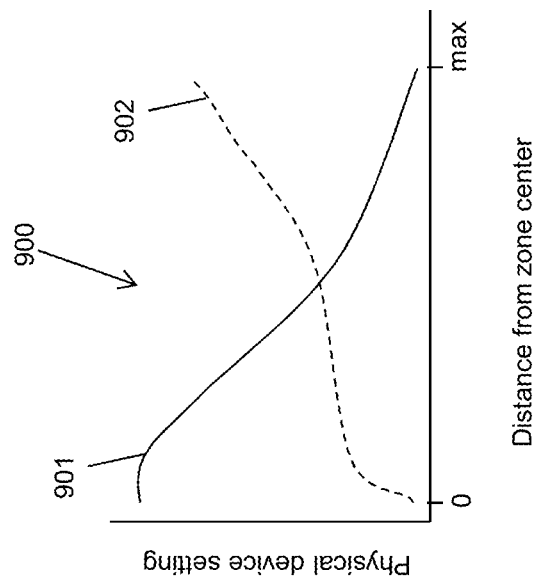
FIG. 9 is a graph illustrating an example relationship stored in memory for controlling a physical device setting relative to an object's distance from a zone's center.

In an example embodiment, the zones and zone attributes database 109 stores the relationships between relative positioning within a zone and a physical device's setting. FIG. 9 shows an example distribution 900 of such a relationship, which can be stored in the database 109. The curve 901 represents a relationship of a first physical device that is assigned to the zone, and the curve 902 represents a different relationship of a second physical device that is assigned to the zone. The relationship is between a trackable or another zone being distanced away from the zone's center, where '0' on the x-axis represents that the trackable or the other zone is positioned at the zone's center and 'max' represents that the trackable or the other zone is positioned at the boundary of the zone.

Figure 10:
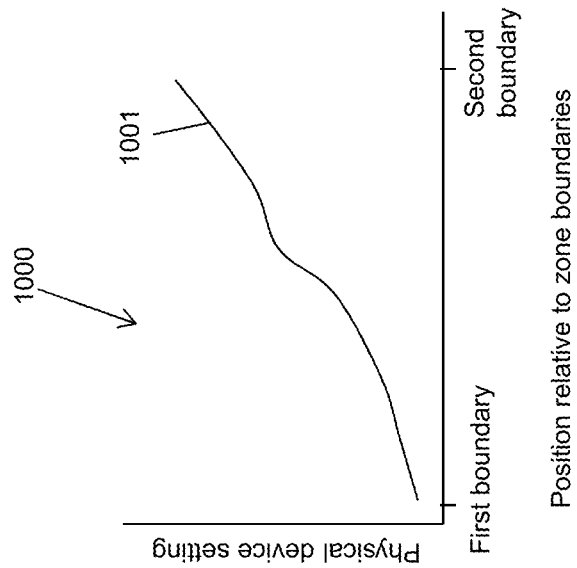
FIG. 10 is a graph illustrating an example relationship stored in memory for controlling a physical device setting relative to an object's distance with respect to a zone's boundaries.

FIG. 10 shows another relationship graph 1000, with the line 1001 showing the distributed relationship between a physical device setting and the position of a trackable or another zone relative to a first boundary and a second boundary. The first boundary and the second boundary, for example, are at opposite ends to each other.

Figure 11:
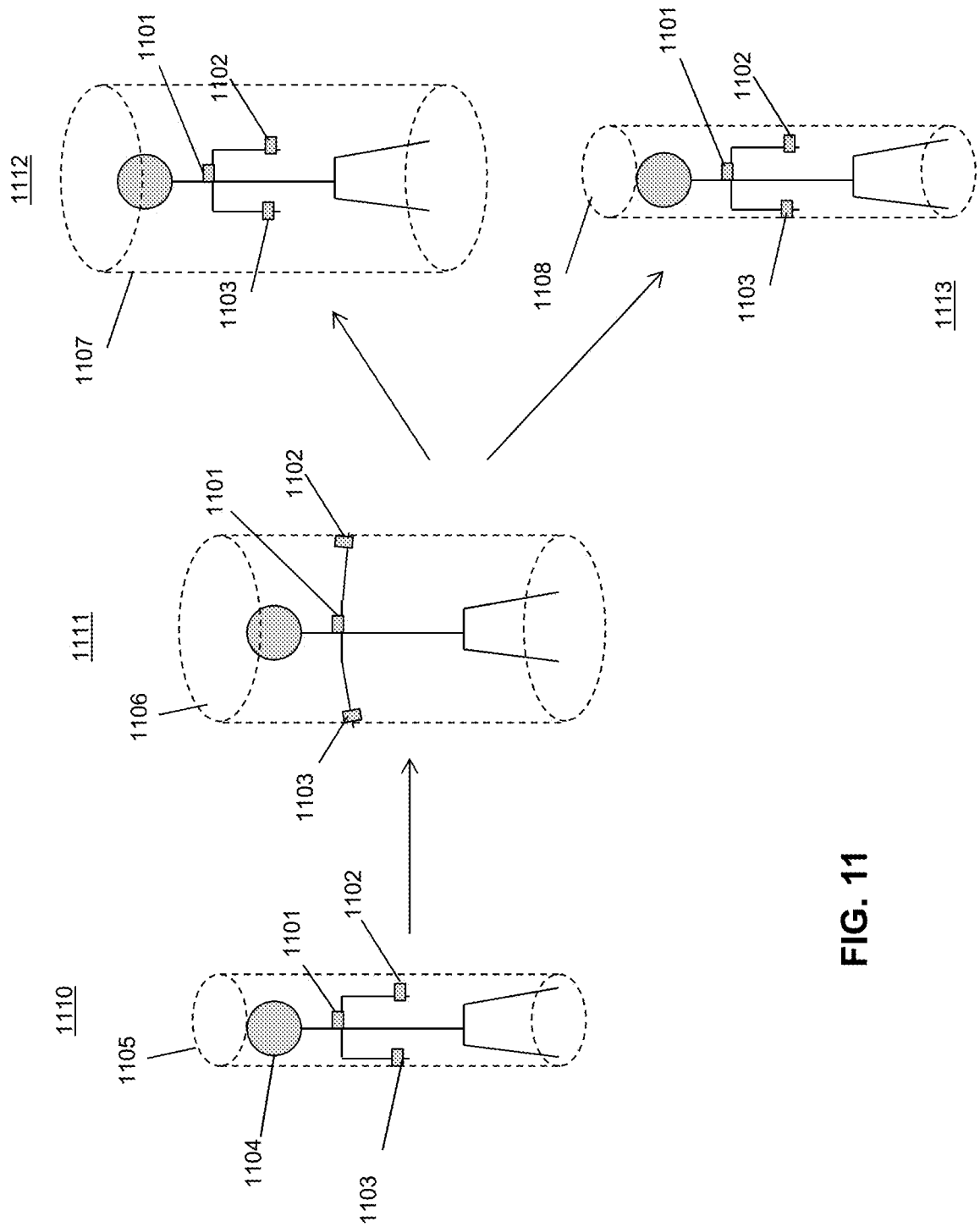
FIG. 11 is a diagram showing an example set of actions detected by a tracking engine to generate a dynamic zone.

FIG. 11 shows another approach to generating a dynamic zone. For example, a person 1105 wears two or more beacons. Beacons 1102 and 1103 are mounted on the left and the right arms of the person, and another beacon 1101 is mounted on the upper body of the person. As these beacons are trackable by the one or more tracking devices 102 in 3D space, the computing system 101 can use the 3D positions of the beacons to compute the boundary and position of a dynamic zone 1105. For example, a center or centroid positioned between the beacon positions is computed, and the center, or an offset from the center, is used to define a zone's center.

In the example shown in FIG. 11, all the beacons on the person are used to compute a center, which is then used to define the zone's center. However, in an alternate embodiment, the computing system only uses a selected beacon to define the position of the zone. The selected beacon, for example, is used to define the zone's center or a corner of a zone, or some other position feature of a zone.

Continuing with FIG. 11, as per instance 1110, the zone 1105 is defined by the computing system 101 based on the position of the beacons 1101, 1102, 1103.

In a subsequent instance 1111, the person spreads out his or her arms, thus moving outwards the beacons 1102 and 1103. The computing system 101 detects the new position and correspondingly increases the size of the zone 1106 so that all the beacons are encompassed by the zone 1106.

In one example further subsequent instance 1112, the person returns their arms to a downward position so that the beacons 1103 and 1102 are closer together. However, even after detecting these new positions, the computing system 101 maintains the zone 1107 at the larger size. In other words, the computing system maintains the dynamic zone at the largest detected size in the zone's history.

In an alternative example to the instance 1112, in the instance 1113, the computing system detects that the beacons 1103 and 1102 are closer together, and consequently updates the zone 1108 to have a corresponding matching size that is smaller. However, the smaller sized zone still encompasses all the beacons.

In a more general example embodiment, the computing system uses the positions of multiple beacons to dynamically change the size of the dynamic zone, as well as the position of the dynamic zone.

Figure 12:
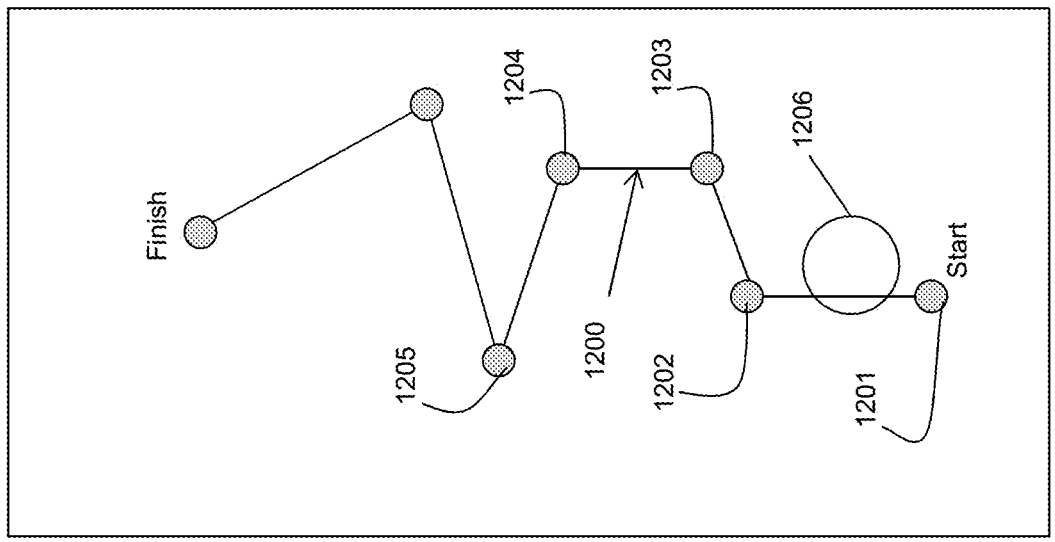
FIG. 12 is a diagram of a top view of a virtual environment that includes a path and a dynamic zone.

Turning to FIG. 12, an example embodiment of a path 1200, shown from a top view, is defined by certain points 1201, 1202, 1203, 1204, and 1205. This path is modelled in the virtual environment and may also be shown in the physical environment. An outline of a dynamic zone 1206 intersect the path, for example, between the segment defined by points 1201 and 1202.

In an example embodiment, the path 1200 is a path defined in a sport venue or a runway venue, or some other venue, in which a person or other trackable thing has to follow within some variance. The variance is controlled by the size of the dynamic zone that surrounds the trackable thing. For example, the larger the size of the dynamic zone, the larger the variance that the trackable thing can veer away from the path 1200. When the dynamic zone intersects the path, as determined by the computing system 101, then a physical device, such as lights, a speaker sound system, or some other system, is activated or controlled to indicate that the trackable thing is following the path. Conversely, if the trackable thing is detected to be too far off the path, since the dynamic zone does not intersect with the path, then the computing device may also output data to cause one or more physical devices to also respond. For example, an alert may sound to indicate that the trackable thing is off the path.

In an example implementation, in the virtual environment will show the path and will also show, overlaid, the time it takes for a trackable to move between the different points along the path. The trackable, to which the dynamic zone is assigned, can be a person, a drone, a car, an animal, an aircraft, a robot, etc.

Figure 13:
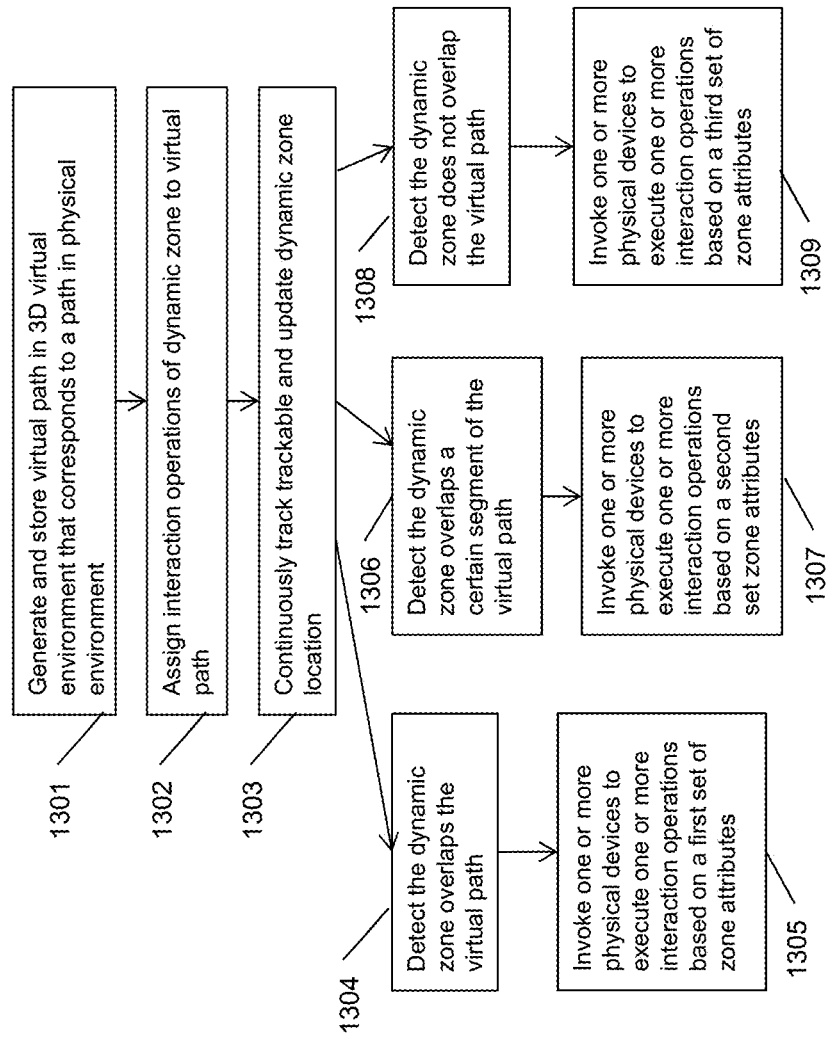
FIG. 13 is a flow diagram illustrating example computer executable instructions for invoking a physical device to respond to an interaction between a dynamic zone and a predefined path.

FIG. 13 provides example executable instructions that can be used track the interaction between a dynamic zone and a path.

At block 1301, the computing system 101 generates and stores a virtual path in the virtual environment, which corresponds to a path in the physical environment. At block 1302, the computing system assigns interaction operations of the dynamic zone to the virtual path. At block 1303, the computing system continuously tracks a trackable and updates the dynamic zone's position in the virtual environment based on the position of the trackable.

In one example embodiment stemming from block 1303, at block 1304, the computing system detects that the dynamic zone overlaps the virtual path. At block 1305, the computing system outputs data that causes one or more physical devices to execute one or more interaction operations based a first set of zone attributes. These first set of zone attributes are stored, for example, in the database 109.

In another example embodiment stemming from block 1303, at block 1306, the computing system detects that the dynamic zone overlaps a certain segment of the virtual path. This certain segment has associated with it certain response interaction operations. For example, the certain segment could be the last segment of the path, and it may trigger a special action from one or more physical devices. At block 1307, the computing system therefore outputs data that causes one more physical devices to executed one or more interaction operations based on a second set of zone attributes.

In another example embodiment stemming from block 1303, at block 1308, the computing system detects that the dynamic zone does not overlap the virtual path. This in turn causes the computing system to invoke the one or more physical devices to execute one or more interaction operations based on a third set of zone attributes.

Figure 14:
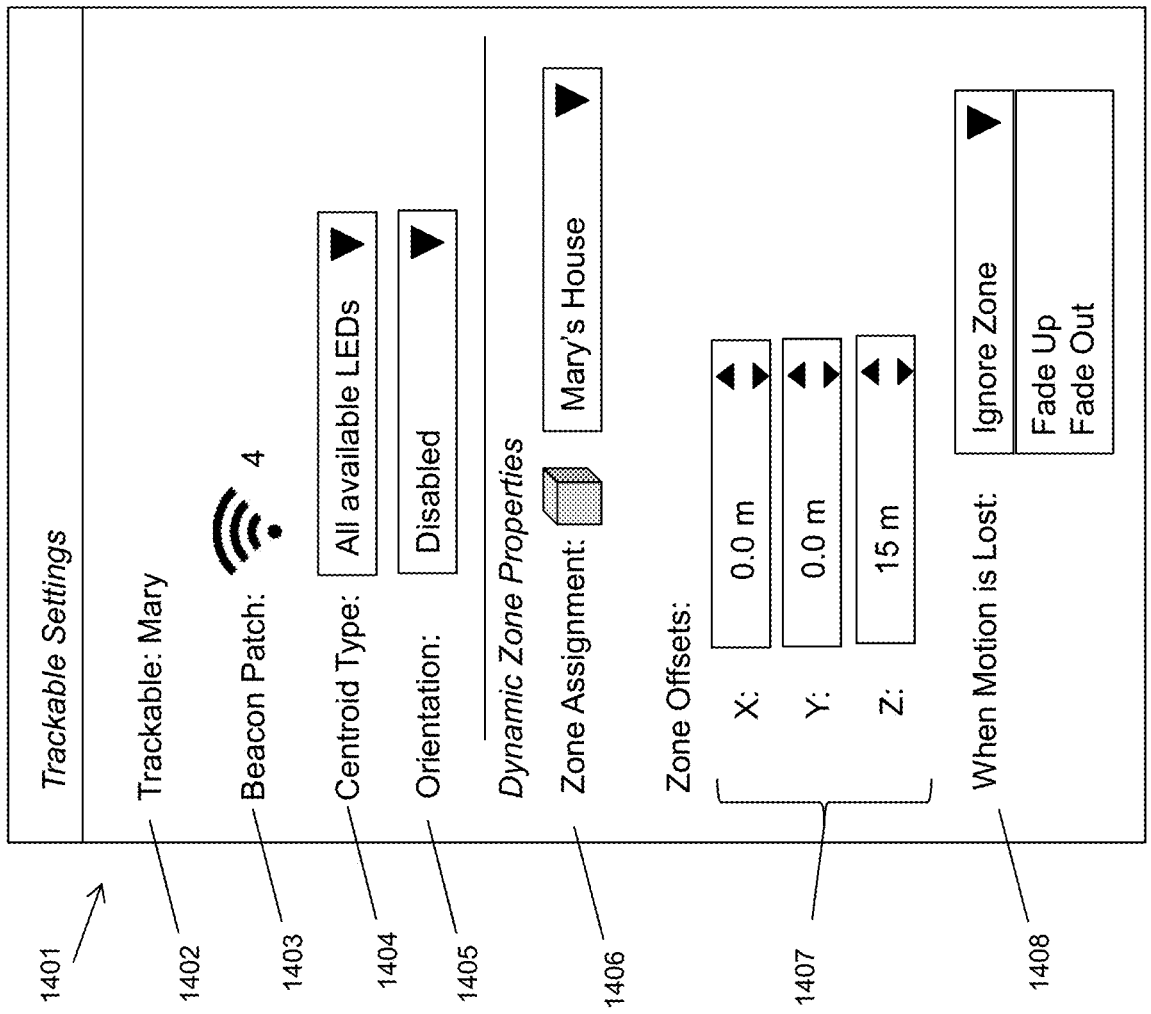
FIG. 14 is an example of a graphical user interface for setting attributes of a dynamic zone.

Turning to FIG. 14, an example GUI 1401 is provided for modifying or assigning attributes to a dynamic zone. For example, the dynamic zone is associated with a certain trackable ID 1402. The dynamic zone is also identified by a beacon patch 1403. The Beacon Patch is the Trackable's Beacon assignment. For example, Mary in this case is the object to be tracked using a tracking beacon (i.e. a trackable), and 'Mary' also is the name of the virtual object within the virtual environment. The server needs to know what the patch/assignment is, and where to get motion from. In this case, Beacon Number 4, which is a specific tracking beacon, has been assigned to Mary.

GUI control 1404 also allows a user to define that the centroid of the virtual object 'Mary' in relation to the centroid of multiple beacons that are being tracked.

GUI control 1405 also allows a user to select whether the orientation is enabled or disabled. When orientation is enabled, the orientation of the trackable is used to correlate the orientation of the virtual object. When orientation is disabled, the orientation of the virtual object being tracked remains the same, regardless of the orientation of the trackable. In an example, the orientation of the virtual object being tracked also defines the orientation of the dynamic zone.

GUI control 1406 allows a user to change the name or label of the zone.

GUI control or controls 1407 allow a user to determine zone offsets, for example, in any one or more of the X, Y and Z axes.

For example, the zone will have an insertion point, as determined by the virtual environment, and this will be the offset from the insertion point.

So for example, if the insertion point is the top right corner of the zone, and there are no offsets, then the zone will move in relation to the top right corner. The centroid that is calculated for the trackable will be equal to that of the top right corner.

If a user or the software automatically specifies an offset of +1 m on the X axis, then the zone will be +1 m from the centroid's X axis, relative to the top right corner.

GUI control 1408 allows a user to determine the response when the trackable's motion is lost. For example, the user can select from the computing system instructing a physical device to ignore the dynamic zone. In another example, the user can select the computing instructing a robotic camera or a robotic light, or both, to fade up, or in another example, to fade out.

Figure 15:
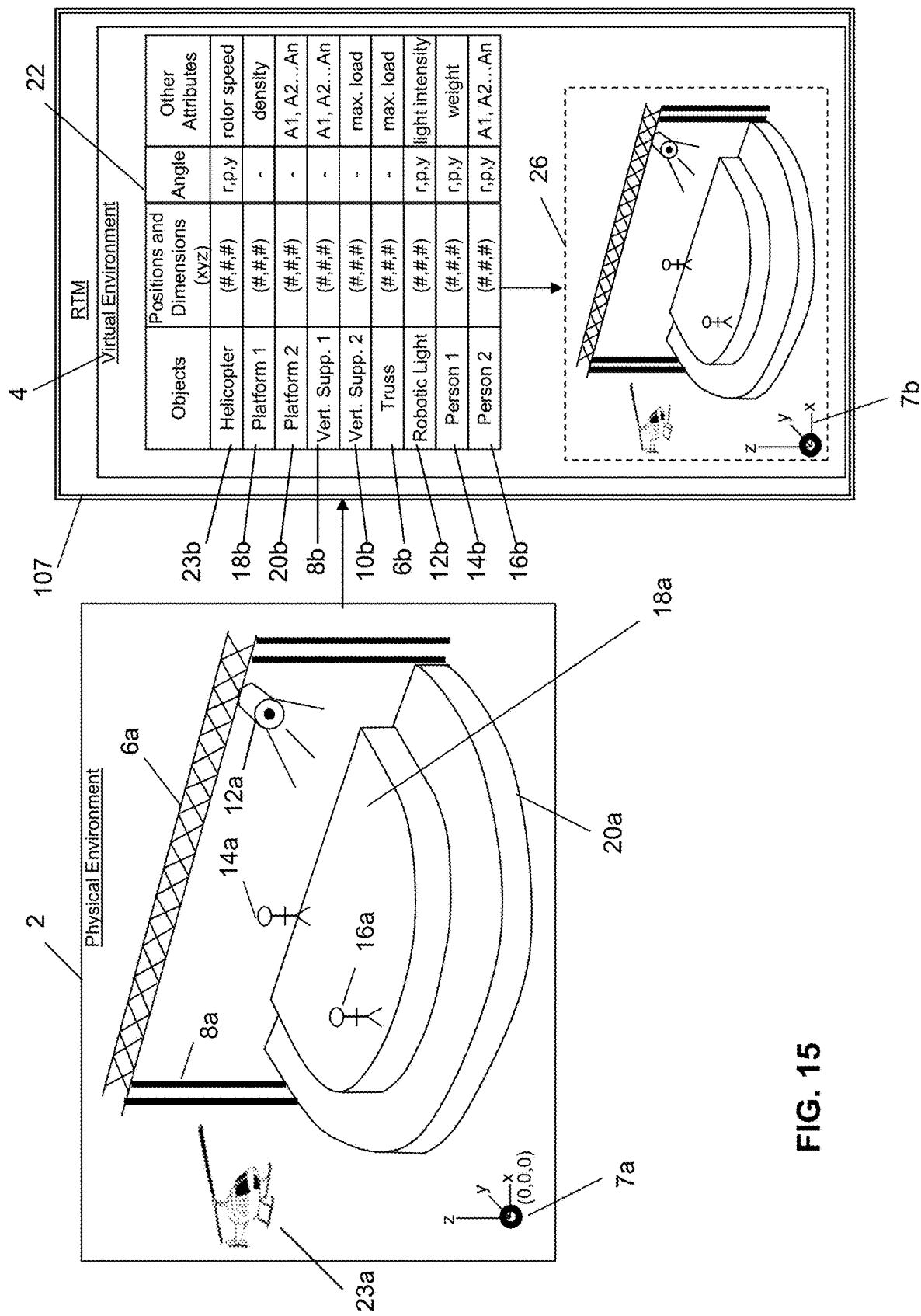
FIG. 15 is a schematic diagram illustrating one example of the generation of a virtual environment from a physical environment using a real-time environment and command module (RTM).

Turning to FIG. 15, further details of the RTM 107 and the use of the tracking engine 106 are provided. A system diagram shows objects in a physical environment 2, in this case a stage, mapping onto a virtual environment 4. It can be appreciated that the virtual environment 4 resides within a computing environment, for example, having various processors, memory, interfaces, computer readable media, etc. Moreover, the virtual environment 4 can also be part of the RTM 107. A memory storage or database 22 of virtual objects and attributes is provided to correspond with the physical objects in the physical environment 2. For clarity, references to physical objects include the suffix 'a' and references to virtual objects include the suffix 'b'. The physical environment 2 in FIG. 15 comprises a first platform 18a supported below by a second platform 20a. An overhead truss 6a extends across the platforms 18a, 20a and is supported at its ends by two vertical supports 8a, 10a. A robotic light 12a is supported on the truss 6a for illuminating the first platform 18a, whereupon a first person 14a and a second person 16a are positioned. A wirelessly controlled helicopter drone 23a is flying above the platforms 18a, 20a. Although not shown, the helicopter drone 23a, the first person 14a, and the second person 16a may each be equipped with their own tracking unit 104. A three-dimensional origin or physical reference point 7a is positioned in front of the platforms 18a, 20a, whereby the positions of the physical objects are measured relative to the physical reference point 7a.

Each of these physical objects in the physical environment 2 are mapped onto the virtual environment 22, such that the virtual environment database 22 organizes the corresponding virtual objects and any corresponding attributes. The physical reference point 7a is mapped into the virtual environment 22, thus forming a virtual origin or reference point 7b. The positions and angular orientations of the virtual objects are mapped relative to the virtual reference point 7b. In this example, the virtual objects comprise a virtual helicopter 23b, a first virtual platform 18b, a second virtual platform 20b, a first vertical support 8b, a second vertical support 10b, a virtual truss 6b, a virtual robotic light 12b, a first virtual person 14b, and a second virtual person 16b. Physical attributes corresponding to each physical objects are also represented as virtual attributes corresponding to each virtual object, wherein attributes typically include the position, angular orientation, and dimensions of the objects as well as any data related to movement of the objects (e.g. speed, rotational speed, acceleration, etc.). In one embodiment, the position may be represented in Cartesian coordinates, such as the X, Y and Z coordinates. Other attributes that may also be used to characterize a virtual object include the rotor speed for the helicopter 23a, the maximum loads on the truss 6a, the angular orientations (e.g. roll, pitch, yaw) and the weight of a person 14b. The position and angular orientation of the helicopter 23a and the persons 14a, 16a, are tracked by the tracking engine 106 and the tracking devices 104, which may or may not use beacons. This information is reflected or updated in the virtual environment 4.

It can be appreciated that accurately depicting the virtual environment 4 to correspond to the physical environment 2 can provide a better understanding of the physical environment, thereby assisting the coordination of the clients within the physical environment. The process of depicting attributes of a physical object onto a corresponding virtual object can be considered a physical-to-virtual mapping. Accurately depicting the virtual environment 4 may comprise generating virtual objects based on data automatically provided by clients connected to the RTM 107. Alternatively, some of the virtual objects and their corresponding attributes may be manually entered into the virtual environment database 22. For example, an operator or technician of the RTM may gather the dimensions of a truss and determine its center of mass and volumetric center. The operator may then create a virtual object with the same dimensions, center of mass and volumetric center that corresponds to the truss. The physical location of the truss, with respect to the physical reference point 7a, is also used to characterize the location of the virtual object. Thus, the virtual object corresponds very closely to the truss in the physical environment.

Other methods of generating a virtual environment 4 that accurately represent a physical environment include the use of three-dimensional computer drawings, floor plans and photographs. Three-dimensional computer drawings or CAD drawings, using many standard file formats such as .dwg, WYG, Viv, and .dxf file formats, can be uploaded through a conversion system, such as BBX, into the RTM's virtual environment 22. The computer drawings of the virtual objects are scaled to match the dimensions of the physical objects; this mapping process does advantageously reduce the time to generate a virtual environment 4. Additionally, floor plans may be used to generate virtual objects. For example, a floor plan of a house showing the location of the walls may be scanned into digital form in the computer. Then, the walls in the virtual environment are given a height that corresponds to the height of the physical walls. Photographs, including 3D photographs, may also be used to create a virtual environment as they typically illustrate relative dimensions and positions of objects in the physical environment regardless of the scale. An operator may use the photograph to generate a three-dimensional computer drawing or generate a virtual object directly by specifying the dimensions of the object. Photographs may also be used to generate a three-dimensional model using semi or fully automated 3D reconstruction algorithms by measuring the shading from a single photograph, or from a set of point correspondences from multiple photographs.

It can also be appreciated that the location of the physical reference point 7a can be positioned in any location. Preferably, the location of the physical reference point 7a is selected in a fixed, open area that facilitates consistent and clear measurement of the locations of physical objects relative to the physical reference point 7a. As can be seen from FIG. 15, the physical reference point 7a is located at the coordinates (0,0,0) in the physical environment. Similarly, the virtual reference point 7b is mapped in the same position as the physical reference point 7a and is located at the coordinates (0,0,0) in the virtual environment. It can be appreciated that accurate correlation between the reference points 7a, 7b can be used to calibrate and verify the correspondence between the physical and virtual environments.

A visualization engine, which will be discussed in further detail with respect to FIG. 17, uses the information stored in the virtual environment database 22 to generate a graphic, thereby illustrating or visualizing the physical environment 2 to permit interaction with a user. In other words, the visualization engine provides a graphic of the virtual environment 4 for display on a display screen, which in turn substantially corresponds to the physical environment 2.

Figure 16:
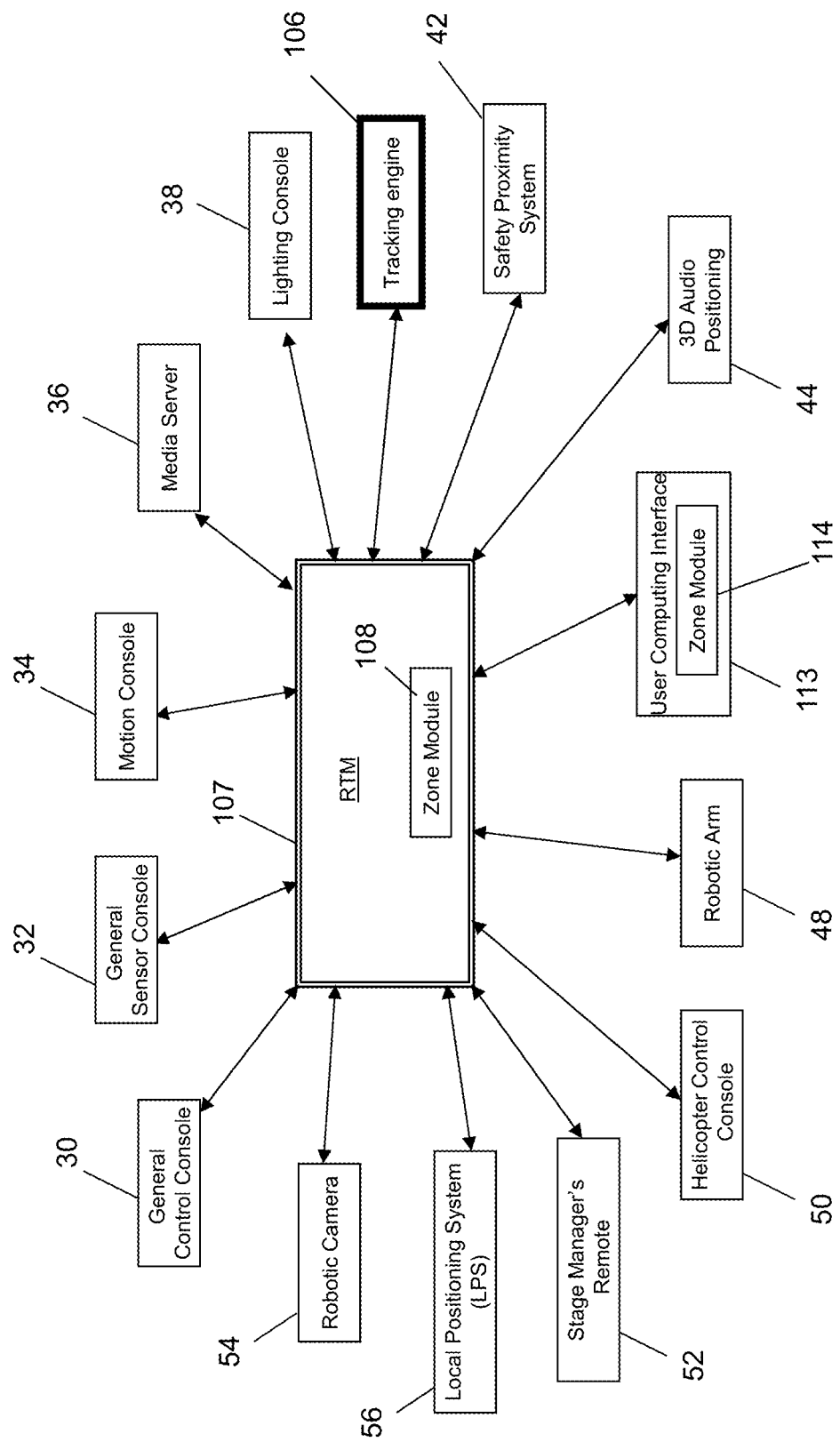
FIG. 16 is a block diagram of one example configuration of a RTM connected to various devices, including a tracking engine, for tracking or controlling physical objects.

Turning to FIG. 16, an example configuration of the RTM 107 is shown in connection with various other devices or computing modules. The RTM, which includes the zone module 108, can be used to coordinate multiple clients for tracking, visualizing and controlling objects in a three dimensional environment, and doing so in relation to static or dynamic zones, or both. The various clients connected to the RTM are able to communicate via the RTM, either directly or indirectly. Thus, the RTM facilitates the coordination of the clients and enables the clients to interoperate, even when provided by different vendors. In this example, the clients include the tracking engine 106, which provides tracking data of one or more objects in six degrees of freedom. Other clients include a general control console 30, general sensor console 32, motion console 34, media server 36, lighting console 38, safety proximity system 42, 3D audio position system 44, user computing interface 113, robotic arm 48, helicopter control console 50, stage manager's remote 52, and robotic camera 54. In an example embodiment, the user computing interface 113 is a computing device that with a display screen and user input devices, and which also includes the zone module 114. The stage manager's remote 52, for example, sends commands to the RTM to control the virtual objects in the virtual environment 4, thereby controlling the media server 36, lighting console 38 and helicopter control console 50. There may also be a local positioning system (LPS) 56 to track a helicopter 23a. It can be appreciated that a LPS 56 refers to any device or combination of devices that can determine the location of an object within a localized environment. Examples of devices used in an LPS 56 include RADAR, SONAR, RFID tracking and cameras. The tracking engine 106 is an example of an LPS 56. Such devices are able to measure or sense various characteristics of the physical environment. It can be appreciated that the number and type of clients connected to the RTM as shown in FIG. 16 is non exhaustive. Further, the RTM is configurable to interact with various numbers and types of clients by providing a common, recognizable interface that the client trusts and will enable to interoperate with other clients that it may not otherwise trust.

The interfacing between a client and the RTM is based on predetermined software protocols that facilitate the exchange of computer executable instructions. In other words, a client sends and receives data and computer executable instructions using a file format that is understood by both the client and the RTM. Examples of such a file format or protocol include dynamic link libraries (DLL), resource DLLs and OCX libraries. Thus, a client having a file format which is recognized by the RTM 107 may interface with the RTM 107. Once the software interfacing has been established, clients can interact with the RTM in a plug and play manner, whereby the RTM can discover a newly connected client, or hardware component, with little or no device configuration or with little additional user intervention. Thus, the exchange of data between the client and RTM begins automatically after plugging the client into the RTM through the common interface. It can be appreciated that many types of clients are configurable to output and receive a common file format and thus, many types of clients may advantageously interact with the RTM. This flexibility in interfacing reduces the integration time as well as increases the number of the RTM's applications. Also, as noted above, this provides the RTM as a trusted intermediate platform for interoperating multiple client types from multiple vendors.

Figure 17:
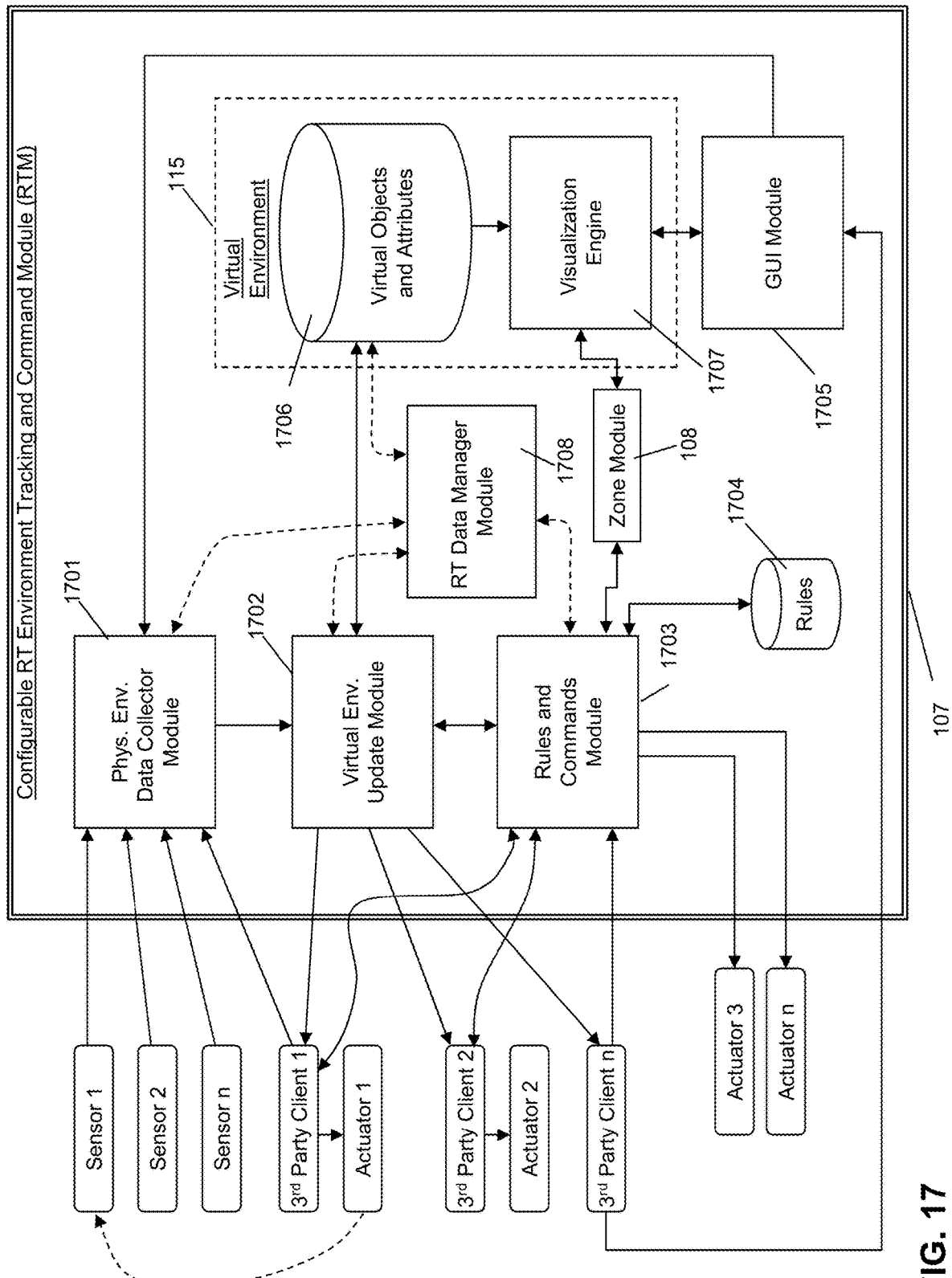
FIG. 17 is a block diagram of an example configuration of an RTM connected to multiple physical devices, and showing example components of the RTM.

Turning to FIG. 17, an example embodiment of the RTM is shown, including its components.

A configuration suitable for coordinating multiple clients in a physical environment is provided. It can be appreciated that the devices that are external to the RTM 107 and connected to the RTM 107 may be referred to as clients. Therefore, the sensors (e.g. Sensor 1, Sensor 2, Sensor n), the 3rd party clients (e.g. 3rd party client 1, 3rd party client 2 and 3rd party client n), and the actuators (e.g. Actuator 1, Actuator 2 and Actuator n) are considered to be clients to the RTM 107. The tracking engine 106 is a client, amongst other clients, of the RTM. The RTM 107 comprises a physical environment data collector module 1701, a virtual environment update module 1702, a rules and commands module 1703, a number of rules in a rules database 1704, a real-time (RT) data manager module 1708, a graphical user interface (GUI) module 1705, and virtual environment 115, wherein the virtual environment 115 comprises the virtual objects and attributes database 1706 and the visualization engine 1707. For clarity, the virtual objects and attributes database 1706 is herein referred to as the virtual environment database. As can be seen, the virtual environment update module 1702 is in communication with the data collector module 1701, the rules and commands module 1703 and the virtual environment database 1706. The rules and commands module 1703 is in communication with the rules database 1704. The visualization engine 1707 is in communication with the virtual environments database 1706 and GUI module 1705. The zone module 108 is in communication with the rules and commands module 1703 and the visualization engine 1707. The rules database 1704 includes rules that govern the responses related to a trackable interacting with a zone, or with zones interacting with each other.

In other words, the zones are displayable via the visualization engine, and the location of zones and other objects are tracked, in order to monitor when and what type of interaction with a zone is detected. Furthermore, based on the detected interaction, a rule is triggered, which in turn can invoke a response action (e.g. to 3rd Party Client 2, or Actuator 3, or some other client).

It can be appreciated that one or more processors execute the computer instructions from each module or engine in FIG. 17. Moreover, the databases can be stored on memory devices, such as random access memory or read only memory devices.

The physical environment data collector module 1701, herein referred to as the collector module, is able to receive data from clients, such as the sensors and one or more given 3rd party clients. The collector module 1701 may comprise or interact with one or more interfaces, not shown, to communicate with the various clients. As can be seen, Sensor 1 tracks the activity or attribute of Actuator 1 and relays the sensed data to the collector module 1701. In addition, the collector module 1701 can receive commands, for example, from 3rd Party Client 1 and from the GUI module 1705. Upon receiving the data from the sensors or commands from other consoles, the collector module 1701 sends the collected data to the virtual environment update module 1702. The virtual environment update module 1702, herein referred to as the update module, is able to exchange data with the virtual environment database 1706, as well as send or broadcast data to clients, including 3rd Party Client 1, 3rd Party Client 2 and 3rd Party Client n. The update module 1702 broadcasts data to the clients through one more communication interfaces within the RTM 107. The update module 1702 also exchanges information with the rules and commands module 1703.

In one example, data about a physical object is sent from Sensor 1 and received by the collector module 1701, which in turn transmits the data to the update module 1702. The update module 1702 sends the data about the physical object to the virtual environment database 1706 to update the attribute of the corresponding virtual object. The update module 1702 also sends the updated data to 3rd Party Client 2, which may use the data to control Actuator 2.

In another example, 3rd Party Client 1 sends a command (e.g. to move Actuator 3) to the collector module 1701, wherein the collector module 1701 then transmits the command to the update module 1702. The command triggers a rule, as stored in the rules database 1704, which limits the movement of the Actuator 3 since it may collide with a zone, for example. In other words, if the predetermined condition relating to a dynamic zone or a static zone is met, then a response is generated for the physical environment and the RTM 107 provides the response to the Actuator 3. It can be appreciated that a number of predetermined conditions and responses may be stored in the form of rules in the rules database 1704. The rule that limits the movement of the Actuator 3 is executed or processed and sent via the rules and command module 1703 to the update module 1702. Thus, the modified command, now modified according to the rule relating to a zone, is sent from the update module 1702 to the virtual environment database 1706 thereby updating virtual Actuator 3, which corresponds to physical Actuator 3. The modified command is also sent from the update module 1702 to the rules and commands module 1703, and from there to physical Actuator 3. It can be seen that the rules and commands module 1703 is also in communication with the virtual environment database 1706 and monitors any changes therein to determine whether one or more rules should be executed.

Figure 18:
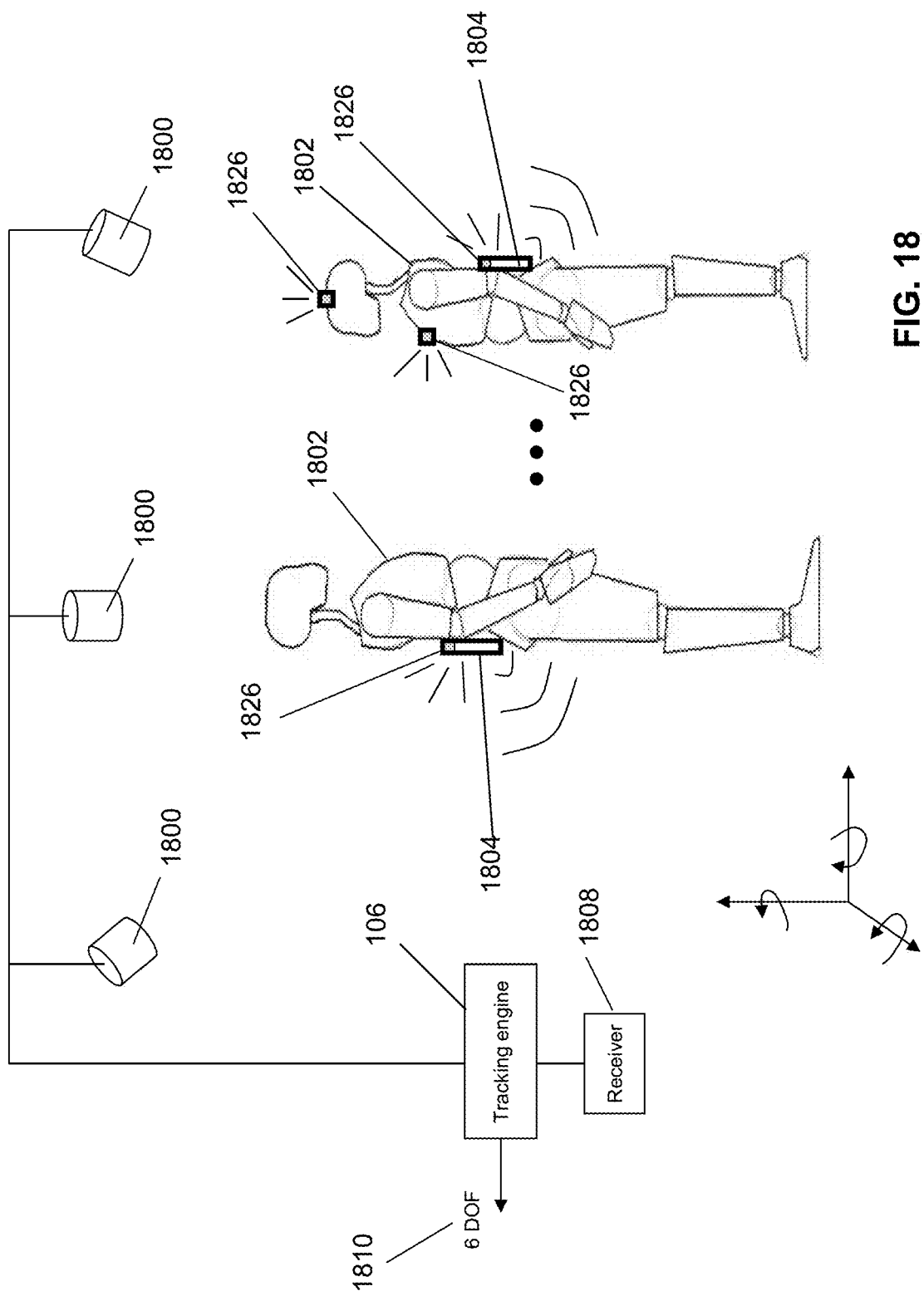
FIG. 18 is a schematic diagram of a tracking engine tracking the position and angular orientation of one or more objects.

An example embodiment of a tracking engine 106 is shown in FIG. 18.

The tracking engine 106 outputs position and angular orientation data of one or more objects, also called trackables. Objects or people 1802 can be tracked by having attached to them a tracking unit 1804. Each object has a tracking unit 1804 which is able to measure at least angular orientation data and able to activate one or more light sources 1826. Two or more cameras 1800 are used to track the position of the light sources 1826. The camera images of the light sources 1826 are sent to the tracking engine 106 for processing to determine the absolute position of the object 1802. The measured angular orientation data is transmitted, preferably, although not necessarily, wirelessly, to the tracking engine 106, for example through the receiver 108. Preferably, the tracking unit 104 is wireless to allow the objects 1802 to move around freely, unhindered. The tracking engine then combines the position data and angular orientation data to generate a six-degrees-of-freedom output (e.g. X, Y, Z coordinates and roll, pitch, yaw angles).

The light source 1826 can be considered a passive reflective marker, a heating element, an LED, a light bulb, etc. The light from the light source 1826 may not necessarily be visible to the human eye. An active light source is preferred to allow the cameras to more easily track the light source. It has also been recognized that light sources visible to the human eye can be distracting. Furthermore, visible light sources can also be washed out or overpowered by other light, such as by spot lights, which make the light source 1826 difficult to track using the camera images. Therefore, it is preferred, although not required, that the light source 1826 be an infrared light source, such an infrared LED, since its light energy is more easily detected amongst the other types of lights being used. Further, infrared sensitive cameras can be used to detect only infrared light, thereby increasing the accuracy of tracking a light source. It can therefore be appreciated that an infrared LED and use of infrared sensitive cameras reduces the effects of various (e.g. bright or low-level) light conditions, and reduces visual distractions to others who may be seeing the tracking unit 1804. The active infrared LEDs can also be viewed at very far distances.

As shown in FIG. 18, some objects may have a single light source 1826, while other objects may have multiple light sources 1826. It can be appreciated that at least one light source 1826 is sufficient to provide image tracking data, although multiple light sources 1826 can increase the image tracking of an object from various angles. For example, if a person 1802 is being tracked by cameras 1800, the light sources 1826 can be more easily seen by the cameras 1800 if the light sources are placed on different parts of the person 1802 (e.g. the head, the back, and the front of the person). In this way, as the person turns or moves around, although one light source 1826 is occluded from the cameras, another light source 126 remains visible to the cameras 1800.

In another embodiment, a single light source 1826 that is associated with an object is preferred in some instances because it is simpler to track from an image processing perspective. By only processing an image of a single light source that corresponds to an object, the response time for tracking the object can be much faster. The benefits are compounded when attempting to track many different objects, and each single light source that is imaged can be used to represent the number of objects. The single light source sufficiently provides the positional data, while allowing the tracking engine 1806 to very quickly process the locations of many objects. Moreover, using a single light source 1826 in each tracking unit 1804 conserves power, and thus the length or period of operation of the tracking unit 1804.

It can also be appreciated that two or more cameras are used to provide tracking in three dimensions. Using known optical tracking methods, the cameras' 2D images of the light source 1826 are used to triangulate a 3D position (e.g. X, Y, Z coordinate) for the light source 1826. Although two cameras are sufficient for determining the position, more than two cameras (e.g. three cameras) can provide more accurate data and can track an object from more angles.

Further, each of the light sources 1826 can be pulsed at certain speeds or at certain strobe patterns. The pulsing or strobe pattern can be used to distinguish a visual tracking signal of a tracking unit 1804 from other lights sources (e.g. stage lighting, car lights, decorative lights, cell-phone lights, etc.) that are within the vicinity of the tracking unit 1804. In this way, the other non-tracking light sources are not mistakenly perceived to be the tracking light sources 1826. The light sources 1826 can also be pulsed at different speeds or at different strobe patterns relative to other tracking light sources 1826, in order to uniquely identify each object. For example, a first light source 1826 can pulse at a first strobe pattern, while a second light source 1826 can pulse at a second strobe pattern. The first and second light sources 1826 can be uniquely identified based on the different strobe patterns. In other words, many different objects can be individually tracked and identified using few cameras.

It can therefore be seen that the combination of the image tracking and inertial tracking accurately provides six degrees of freedom at very high response rates. Further, the objects can be tracked from far distances. Additionally, multiple objects can be tracked by simply attaching a tracking unit 1804 onto each object that is to be tracked.

Figure 19:
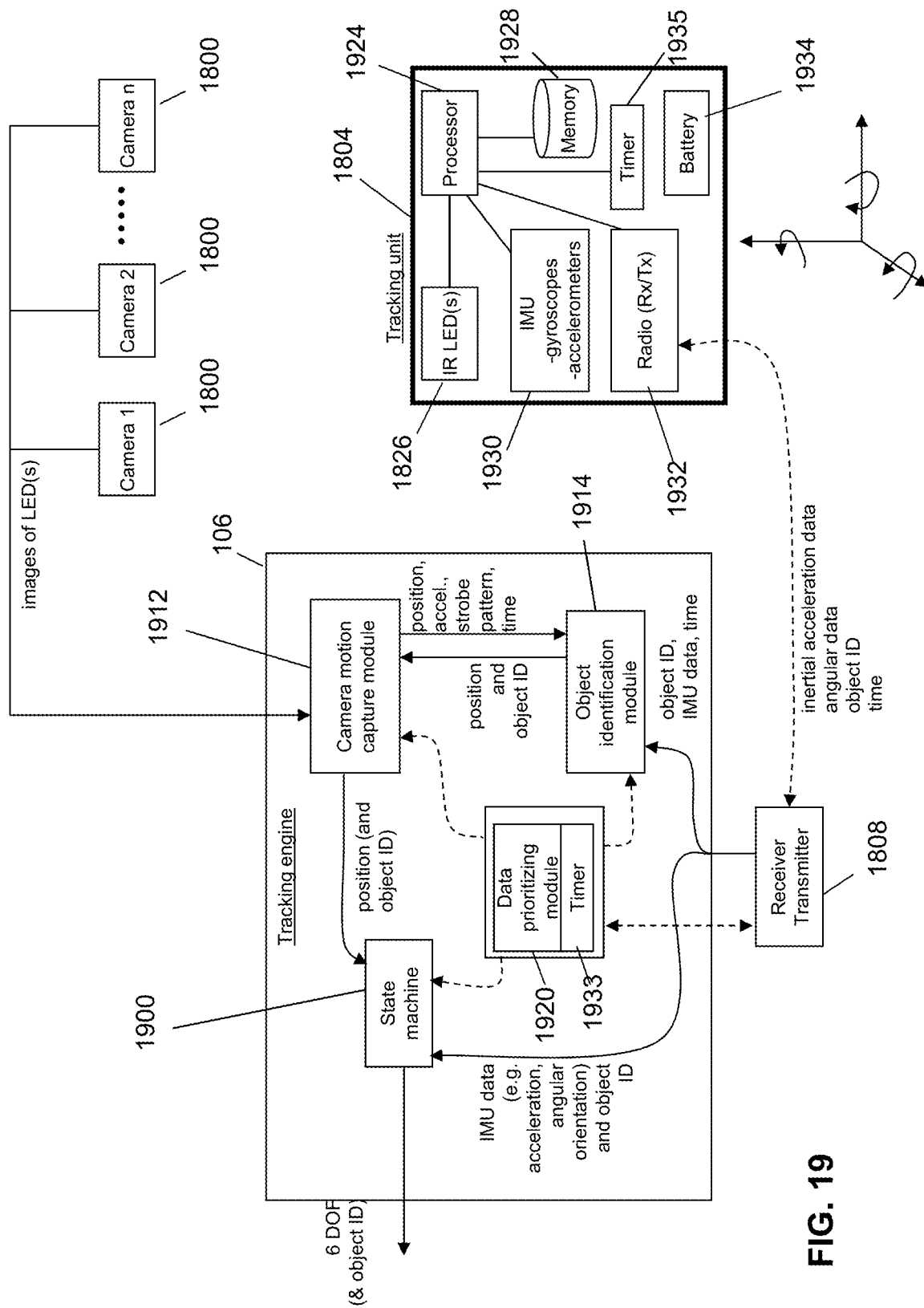
FIG. 19 is a block diagram of an example configuration of a tracking engine and tracking unit.

Turning to FIG. 19, an example configuration of a tracking unit 1804 and a tracking engine 106 are shown. The tracking unit 1804 includes a processor 1924, one or more infrared LEDs 1926, an inertial measurement unit (IMU) 1930, a radio 1932, a timer 1935, memory 1928 and a battery 1934. It is noted that an infrared LED 1926 is one of many different types of light sources 1826 that can be used herein, and thus, reference numeral 1826 is used interchangeably with the infrared LED and with light sources in general. Although a battery 1934 is shown, it can be appreciated that the tracking unit 1804 can be powered through alternate known means, such as power chords. Further, although a radio 1932 is shown, it can be appreciated that other wired or wireless communication devices can be used with the tracking unit 1804. It can be appreciated that the packaging or assembly of the tracking unit or tracking apparatus 1804 can vary. For example, the one or more LEDs 1286 may be located on one part of the object and the IMU 130 may be located on another part of the object. In another example, the LED 1826 could be attached to the object by plugging in the LED 1826 into the object, and connecting the LED 1826 to the processor 1924 through wired or wireless communication. In an example embodiment, multiple LEDs 1826 are affixed to different locations on an object or a person, and the LEDs are connected by wire or wirelessly to a housing that houses the processor, the memory, the IMU, etc. The tracking unit or tracking apparatus 1804 can be attached to an object using a belt, fastener, adhesive, clip, weld, bolts, etc. In another embodiment, more than one tracking unit 1804 can be attached to an object. For example, when tracking different body parts on a person, one tracking unit 1804 can be placed on an arm, another tracking unit 1804 can be placed on the person's waist, and another tracking unit 1804 can be placed on a leg. It can therefore be appreciated that the tracking unit 104 can be attached to an object in various ways.

In an example embodiment, multiple light sources 1826 are attached or are part of the same tracking apparatus 1804. Each light source 1826 strobes or has a blinking pattern that conveys the same object identification (ID), but also has a blinking pattern that differs from the other light source(s) of the same tracking apparatus. In this way, each light source is uniquely identified from another light source of the same tracking apparatus, while still being able to identify that the different light sources are associated with the same object ID. For example, each light has a unique strobe pattern, although more than one strobe pattern may be associated with the same object ID. In another example, different light sources associated with the same tracking apparatus (e.g. same object ID) operate using the same strobe pattern.

The battery 1934 can be rechargeable and is used to power the components of the tracking unit 1804. The IMU 1930 may comprise three axis gyroscopes and three axis accelerometers for measuring angular orientation and inertial acceleration, respectively. The angular orientation information and inertial acceleration measured from the IMU 1930 is wirelessly transmitted through the radio 1932 to the tracking engine 1806. As described above, other data communication methods and devices are also applicable. The processor 1924 also associates with the IMU data an object identification. The object identification can be stored in memory 1928. A separate timer 1935 is provided, or the processor 1924 also acts as a timer, to record a time stamp at which the inertial measurement data is measured or obtained. As will be discussed below, the time stamp may be used to help correlate the measurement data from the IMU 1930 with other data obtained from the cameras. The timer 1935 (or as implemented by the processor 1924) is synchronized with the timer 1933 of the tracking engine.

As discussed earlier, tracking units 1904 can be associated with a strobe pattern or blinking pattern. Therefore, the memory 1928 can store the strobe pattern for the infrared LED 1826 and the associated object identification. The processor 1924 retrieves the object identification and wirelessly transmits the object identification with the IMU measurements and, optionally, the associated time stamps associated with each of the IMU measurements; this data is received by the receiver and transmitter 1808 at the tracking engine 106. The processor 1924 also retrieves the strobe pattern associated with the object identification and controls the flashing of the infrared LED 1826 according to the strobe pattern. The processor 1924 also has the ability to send commands, for example, through the radio 1932, to activate operations in other control devices. Although not shown, in an embodiment using wireless communication, the antennae of the receiver and transmitter 1808 can be physically attached to the cameras 1800 in order to create a wireless mesh allowing the tracking engine 106 to more easily communicate with the one or more tracking units 1804. In other words, each camera 1800 can attached an antenna of the receiver and transmitter 1808. The wireless communication can, for example, use the Zigbee protocol.

Continuing with FIG. 19, the light from the infrared LED 1826 is detected by two or more cameras 1800. The cameras 1800 are preferably able to acquire images at a high rate and are connected to the tracking engine 106 in a way to increase data transfer. For example, the cameras can gather images at 240 frames per second and are connected in a star configuration. The cameras may also be Ethernet cameras. The camera images are sent to the tracking engine 106.

In an example embodiment, a time stamp for each image is generated by the tracking engine 106 (e.g. via the timer 1933). In particular, the timer 1933 keeps the time and sends time information to each camera. In return, each camera uses the time information to mark each image with the received time information, and sends the image and time information to the tracking engine. It will be appreciated that the timers of each of the one more tracking units, the cameras and the tracking engine are synchronized.

In another example embodiment, such as in the alternative or in addition, each of the cameras 1800 also have a timer that is synchronized with the timer of the tracking unit 1804, and the timer of each camera records a time stamp of each image that is captured.

The tracking engine 106 can be a computing device or series of computing devices operating together, herein collectively referred to as a computing device. The tracking engine 106 includes: a camera motion capture module 1912 for identifying the one or more light sources and associated data (e.g. position, acceleration, heading, strobe patterns, time stamps, etc.); an object identification module 1914 for identifying objects and associated data; a data prioritizing module 1920 for prioritizing the processing and transfer of data; a timer 1933 for keeping time and synchronizing time between the devices; and a state machine 1900 for collecting different data measurements and calculating the current state (e.g. position and angular orientation) of one or more objects.

The timer 1933 may interact with one or more of the modules in the tracking engine and may interact with the cameras and the tracking apparatus. In an example embodiment, the timer operates as a counter and increments (e.g. counts up) once every set interval of time. In an example embodiment, the counter increments every 10 milliseconds, or, in other words, the counter increments upwards 100 times a second. The timer 1933 is initialized at zero, along with any other timers (e.g. of the one or more tracking apparatuses and as well as, optionally, other devices). The value of the timer 1933 counts upwards, one integer at a time (e.g. 0, 1, 2, 3, etc.). The value of the timer is herein also called a time stamp.

The timer 1933 sends this time data to each camera. In an example embodiment, the time information used to mark each image is the same as the frame number of each camera. For example, if the timer 1933 and each camera operate at the same rate, such that the timer increments at the same rate as each camera captures an image, then the time information (e.g. time stamp) is used to mark the frame number. As a further example, the timer 1933 may increment at a rate of 100 times per second (e.g. frequency of 100 Hz) and each camera 1800 operates at 100 frames per second (e.g. captures 100 frames per second). In this example, if the cameras 1800 and the timer 1933 operate at the same rate, when the timer has a value '1', a camera's frame ID or number is '1'; when the timer has a value '2', another camera's frame ID or number is '2'; when the timer has a value of '3', yet another camera's frame ID or number is '3'; and so forth.

In an example embodiment, the timer 1933 sends a synchronization signal to the cameras more often than it sends a synchronization signal to each tracking apparatus. The time synchronization signal includes the current time value of the tracking engine's timer 1933, which is used by other devices to ensure they have the same time value. In an example embodiment, the timer 1933 sends a time synchronization signal to each camera at the same rate of the frames-per-second. In an example embodiment, the timer 1933 sends a time synchronization signal, comprising the value of the timer 1933, every 10 milliseconds (e.g. 100 times a second), and the tracking engine receives an image from each camera every 10 milliseconds (e.g. 100 frames per second). In an example embodiment, the timer 1933 sends a time synchronization signal, comprising the value of the timer 1933, once every second (e.g. at a frequency of 1 Hz). It will be appreciated that other frequencies and frame-per-second values can be used other than the values explicitly described herein.

It is appreciated that the time synchronization signal is preferably, though not necessarily, sent more often to the cameras compared to the tracking apparatuses since the positioning data obtained from the cameras is more time-sensitive and a higher-degree of position accuracy may be obtained from the images. The time synchronization data may be sent less frequently to each tracking apparatus, compared to the cameras, since the IMU data measured by each tracking apparatus may not be as time-sensitive.

In an example embodiment, the tacking apparatus transmits yaw, pitch and roll, as well as X,Y,Z coordinates or acceleration data along such axes. The position coordinates or acceleration data may be redundant in view of the image data and later only used in the case of obfuscation (absence of the pulsing lights or strobe lights in the images). The data from the tracking apparatus is sent over a wireless transmission that may be packaged to match the data inflow from the cameras (e.g. along a CAT6 cable or other wire) to the tracking engine.

The camera motion capture module 1912 receives the images and, optionally the frame IDs (e.g. where each frame ID is also used as a time stamp), from the cameras 1800 and determines the three dimensional position of each infrared LED 1826. Known imaging and optical tracking techniques can be used. It will be appreciated, however, that the proposed systems and methods described herein are able to track and identify many objects based on the imaging data, and such systems and methods can be combined with imaging techniques.

The camera motion capture module 1912 is also able to detect strobe patterns of the LEDs. In one embodiment, the camera motion capture module 1912 uses the strobe patterns to differentiate light sources 1826 for tracking from other light sources (e.g. car lights, decorative lights, cell phone lights, etc.) that are not used for tracking. In other words, only light sources 1826 having a strobe pattern are tracked for their position.

It will be appreciated that the time stamps (e.g. or frame ID) associated with the images and the time stamps associated with the IMU data, where the data sets have the same object ID, can be used to temporally align the image data and the IMU data. In other words, it can be determined which data from the different data sets occurred at the same time.

The camera motion capture module 1912 can also extract data for identifying objects. In one approach for identifying an object, the camera motion capture module 1912 determines the current position of an infrared LED 1826 and sends the current position to the object identification module 1914. The object identification module 1914 compares the current position with previous positions that are associated with known object IDs. If a current position and a previous position are sufficiently close to one another, taking into account the time elapsed between the position measurements, then the current position of the infrared LED 1826 is associated with the same object ID corresponding to the previous position. The object identification module 1914 then returns the position and object ID to the camera motion module 1912. In another approach, the camera motion capture module 1912 determines the acceleration and heading of a given infrared LED 1826 and this information is sent to the object identification module 1914. The object identification module 1914 also receives from a tracking unit 1804 acceleration data, an associated object ID and optionally a time stamp associated with inertial data (e.g. acceleration data). The object identification module 1914 then compares the acceleration determined from the camera motion capture module 1912 with the acceleration sent by the tracking unit 1804. If the acceleration and headings are approximately the same, for example within some allowed error value, then the location of the given infrared LED is associated with the same object ID corresponding to the acceleration data from the tracking unit 1804. The object identification module 1914 then returns the position of the infrared LED 1826 and the associated object ID to the camera motion capture module 1912. In another approach for identifying objects associated with the infrared LEDs 1826, as described above, the camera motion capture module 1912 is able to detect strobe patterns. In addition to using strobe patterns to distinguish non-tracking lights from tracking lights, the strobe patterns can also be used to identify one object from another object. For example, the position and strobe pattern of a certain LED is sent to the object identification module 1914. The object identification module 1914 holds a database (not shown) of object IDs and their corresponding strobe patterns. The module 1914 is able to receive object IDs and strobe patterns from the tracking units 1804, via the receiver 1808. The object identification module 1914 receives the position and strobe pattern from the camera motion capture module 1912 and identifies the corresponding object ID based on matching the imaged strobe pattern with known strobe patterns in the database. When a match is found, the position and object ID are sent back to the camera motion capture module 1912. In another example approach, the object identification module is able to compare data obtained from the tracking unit 1804 with data obtained from the camera motion capture module 1912 when the data from the unit 1804 and the module 1912 have the same time stamp information. If the different data has the same time stamp information and is similar to each other (e.g. acceleration, velocity, etc. is generally the same based on images and the inertial measurements), then the data is associated with the same object.

The above approaches for tracking and identifying multiple tracking units 1804 and objects can be combined in various ways, or used in alternative to one another. It can be appreciated that the object identification module 1914 can also directly output the positions of the infrared LEDs 1826 to the state machine 1900.

The state machine 1900 receives the position and associated object ID from the camera motion module 1912 or the object identification module 1914. The state machine 1900 also receives the IMU data (e.g. acceleration, angular orientation, true north heading, etc.) from the receiver 1808. In an example embodiment, time stamps associated with the IMU data and the position information from the camera motion module 1912, as well as the object IDs, are used to associate the information with each other (e.g. based on matching time stamps and matching object IDs). The state machine 1900 uses these measurements to update the state models. In one example, the state machine 1900 uses a particle filter to update the state models. Examples of such particle filters include the Kalman filter and extended Kalman filter, which are known algorithms for estimating a system's varying quantities (e.g. its position and angular orientation state) using control inputs and measurements. In the proposed systems and methods, the measurement data is gathered from the cameras 1800 and IMU 1930.

In another aspect of the system, it is appreciated that multiple tracking units 1804 may communicate with the tracking engine 1806

It will be appreciated that the tracking system describe with respect to FIGS. 18 and 19 is a preferred example that can be used to track the location of zones and trackables. However, other currently known or future known tracking systems can be used to determine the location of the trackables.

General example embodiments and aspects are provided below.

In a general example embodiment, a computing system is provided for automatically controlling a camera device. The computing system includes: a communication device able to receive position data about a physical object in a physical environment and to transmit data to control the camera device; memory for storing a three dimensional virtual environment, the virtual environment corresponding to the physical environment; the virtual environment comprising a virtual object that corresponds to the physical object, and a zone defining a volume of space within the virtual environment; the memory further storing a zone database that comprises zone attributes of the zone, including one or more interaction operations to execute when the virtual object is within the zone; and a processor. The processor is configured to execute at least the following instructions: receive a current position of the physical object; update the virtual environment by moving the virtual object to a new position, the new position corresponding to the current position of the physical object; detect that the virtual object is positioned in the zone; and access the zone database to obtain and subsequently execute an interaction operation, the interaction operation comprising data to control the camera device in relation to at least one of the zone and the physical object.

In an example aspect, the zone attributes further include a time range in which the zone is active to execute the interaction operation.

In another example aspect, the interaction operation includes data that controls the camera device to film the physical object while located in the zone.

In another example aspect, the interaction includes data that further controls the camera device to film the physical object at a certain magnification setting.

In another example aspect, after detecting that the virtual object is no longer positioned in the zone, the processor executes instructions to place the camera device in a standby setting.

In another example aspect, after detecting that the physical object is no longer trackable in the zone, the processor executes instructions to cause the camera device at a magnification setting that includes the entire zone in the camera device's field of view.

In another general example embodiment, a system is provided for automatically controlling a physical device. The system includes: a communication device able to receive position data about at least two physical objects in a physical environment and to transmit data to control the physical device; memory for storing a three dimensional virtual environment, the virtual environment corresponding to the physical environment; the virtual environment comprising a first virtual object that corresponds to a first physical object, a dynamic zone defining a volume of space around the first virtual object, and a second virtual object that corresponds to a second physical object; the memory further storing a zone database that comprises zone attributes of the dynamic zone, including one or more interaction operations to execute when the second virtual object is within the dynamic zone; and a processor. The processor is configured to execute at least the following instructions: receive a current position of each of the first and the second physical objects; update the virtual environment by moving the first virtual object to a first new position based on the current position of the first physical object, and moving the dynamic zone to encompass the first new position corresponding to the current position of the first physical object; update the virtual environment by moving the second virtual object to a second new position based on the current position of the second physical object; detect that the second virtual object is within the dynamic zone; and access the zone database to obtain and subsequently execute an interaction operation, the interaction operation comprising data to control the physical device.

In an example aspect, the zone attributes further include spatial dimensions and a shape of the dynamic zone.

In another example aspect, the first physical object includes a trackable beacon, and the dynamic zone is centered at the trackable beacon.

In another example aspect, the first physical object includes a trackable beacon, and the dynamic zone's position is offset relative to the trackable beacon.

In another example aspect, the first physical object includes a trackable beacon, and the dynamic zone is centered at a centroid of the first physical object.

In another example aspect, after detecting that motion of the first physical object can no longer be tracked, the processor executes instructions to cause the physical device to ignore interacting with the dynamic zone.

In another example aspect, the physical device is robotic camera or a robotic light and, after detecting that motion of the first physical object can no longer be tracked, the processor executes instructions to cause the physical device to fade up or fade out.

In another example aspect, the physical device is one of a robotic light, a media project, a robotic camera, a sound system, and a dispenser.

In another example aspect, the physical device is a media projector and the interaction operation comprises data to control the media projector to display predefined digital content.

In another example aspect, the physical device is a sound speaker and the interaction operation comprises data to control the sound speaker to place audio content at a certain volume.

In another example aspect, the physical device is controlled to interact with at least one of the dynamic zone, the first physical object and the second physical object In another general example embodiment, a zone-based control system is provided, which includes: a tracking beacon comprising a light source; two or more cameras that capture images of the tracking beacon; a computing system in communication with the two or more cameras, the computing system obtaining images from the cameras to determine a current position of the beacon, generating a dynamic zone that moves with the current position of the beacon, and, responsive to detecting an object entering the dynamic zone of the beacon, generating and transmitting a control command; and a physical device that receives the control command from the computing system, the control command triggering the physical device to interact with the dynamic zone.

In another general example embodiment, a computing system is provided for establishing dynamic zones. The computing system includes: a communication device to receive tracking data of a beacon; a processor; a display for displaying a graphical user interface (GUI); and memory. The memory includes executable instructions for: displaying the GUI comprising controls to select a beacon ID corresponding to the beacon, select a positioning of a zone's center in a virtual environment relative to a position of the beacon, and select an interaction operation for a physical device in a physical environment; generating the zone in the virtual environment and updating the zone's position in real-time relative to a current position of the beacon, the current position derived from the tracking data; and, responsive to detecting another object within the zone, invoking the physical device to perform the interaction operation.

In another general example embodiment, a computing system for automatically controlling a physical device is provided. The computing system includes: a communication device able to receive position data about a physical object in a physical environment and to transmit data to control the physical device; memory for storing a three dimensional virtual environment, the virtual environment corresponding to the physical environment; the virtual environment comprising a virtual object that corresponds to the physical object, and a zone defining a volume of space within the virtual environment; the memory further storing a zone database that comprises zone attributes of the zone, including one or more interaction operations to execute when the virtual object is within the zone; and a processor. The processor is configured to execute at least the following instructions: receive a current position of the physical object; update the virtual environment by moving the virtual object to a new position, the new position corresponding to the current position of the physical object; detect that the virtual object is positioned in the zone; and access the zone database to obtain and subsequently execute an interaction operation, the interaction operation comprising data to control the physical device in relation to at least one of the zone and the physical object.

It can be appreciated that the above systems and methods can be applied to, for example, tracking objects, animals or people, or for any moving or static item whereby its position and its direction of movement are desired to be known. Similarly, dynamic zones may be associated with any object, animal, person, etc. that moves. The systems and methods can be used for tracking zones in lighting, audio, and entertainment marketplaces, military, security, medical applications, scientific research, child care supervision, sports, etc.

The schematics and block diagrams used herein are just for example. Different configurations and names of components can be used. For instance, components and modules can be added, deleted, modified, or arranged with differing connections without departing from the spirit of the invention or inventions.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A computing system for controlling zone interaction, comprising:
    memory for storing a three-dimensional virtual environment and a graphical user interface (GUI); and
    a processor configured to execute at least the following instructions: receive input through the GUI to assign one or more zone attributes to a zone, which comprises a volume of space in the virtual environment; assign a virtual object to the zone, the virtual object residing in the virtual environment; assign an interaction between the virtual object and the zone for triggering an operation, the interaction comprising the virtual object moving into the zone; and assign the operation to be executed responsive to detecting the interaction.

2. The computing system of claim 1 wherein a current position of the virtual object corresponds to a current position of a physical object in a physical environment.

3. The computing system of claim 1 further comprising a communication device; and wherein, responsive to detecting that the virtual object has moved into the zone, the processor executes the operation, which comprises transmitting, via the communication device, a command to affect an external device.

4. The computing system of claim 3 wherein the external device displays digital content.

5. The computing system of claim 1 further comprising a visualization engine stored in the memory, the visualization engine generating graphics in relation to the virtual environment configured for display.

6. The computing system of claim 1 further comprising a communication device able to receive position data about a physical object, wherein the virtual object corresponds to a physical object, and the processor is configured to update the virtual environment by moving the virtual object to a new position, the new position corresponding to the position data of the physical object.

7. A method for controlling zone interaction, comprising:
    displaying a graphical user interface (GUI) that is in data access to a three-dimensional virtual environment, the GUI and the virtual environment residing on a computing system;
    receiving input through the GUI to assign one or more zone attributes to a zone, which comprises a volume of space in the virtual environment; assign a virtual object to the zone, the virtual object residing in the virtual environment; assign an interaction between the virtual object and the zone for triggering an operation, the interaction comprising the virtual object moving into the zone; and assign the operation to be executed responsive to detecting the interaction; and
    responsive to the computing system detecting that the virtual object has moved into the zone, the computing system executing the operation.

8. The method of claim 7 further comprising the computing system updating a current position of the virtual object based on a current position of a physical object, and the virtual object corresponds to the physical object.

9. A computing system for controlling zone interaction, comprising:
    memory for storing a three-dimensional virtual environment and a graphical user interface (GUI); and
    a processor configured to execute at least the following instructions: receive input through the GUI input to assign one or more zone attributes to a zone, which comprises a volume of space in the virtual environment; assign a virtual object to the zone, the virtual object residing in the virtual environment; assign an interaction between the virtual object and the zone for triggering an operation, the interaction comprising the virtual object leaving the zone; and assign the operation to be executed responsive to detecting the interaction.

10. The computing system of claim 9 wherein a current position of the virtual object corresponds to a current position of a physical object in a physical environment.

11. The computing system of claim 9 further comprising a communication device; and wherein, responsive to detecting that the virtual object has left the zone, the processor executes the operation, which comprises transmitting, via the communication device, a command to affect an external device.

12. The computing system of claim 11 wherein the external device displays digital content.

13. The computing system of claim 9 further comprising a visualization engine stored in the memory, the visualization engine generating graphics in relation to the virtual environment configured for display.

14. The computing system of claim 9 further comprising a communication device able to receive position data about a physical object, wherein the virtual object corresponds to a physical object, and the processor is configured to update the virtual environment by moving the virtual object to a new position, the new position corresponding to the position data of the physical object.

15. A method for controlling zone interaction, comprising:
displaying a graphical user interface (GUI) that is in data access to a three-dimensional virtual environment, the GUI and the virtual environment residing on a computing system;
receiving input through the GUI to assign one or more zone attributes to a zone, which comprises a volume of space in the virtual environment; assign a virtual object to the zone, the virtual object residing in the virtual environment; assign an interaction between the virtual object and the zone for triggering an operation, the interaction comprising the virtual object leaving the zone; and assign the operation to be executed responsive to detecting the interaction; and,
responsive to the computing system detecting that the virtual object has left the zone, the computing system executing the operation.

16. The method of claim 15 further comprising the computing system updating a current position of the virtual object based on a current position of a physical object, and the virtual object corresponds to the physical object.

17. A computing system for controlling zone interaction, comprising:
memory for storing a three-dimensional virtual environment and a graphical user interface (GUI); and
a processor configured to execute at least the following instructions: receive input through the GUI to assign one or more zone attributes to a zone, wherein the zone attributes comprise a shape, one or more dimensions, and a position in the virtual environment; assign a virtual object to the zone, the virtual object residing in the virtual environment; assign an interaction between the virtual object and the zone for triggering an operation; and assign the operation to be executed responsive to detecting the interaction.

18. The computing system of claim 17 wherein a current position of the virtual object corresponds to a current position of a physical object in a physical environment.

19. The computing system of claim 17 further comprising a communication device;
and wherein, responsive to detecting the interaction between the virtual object and the zone, the processor executes the operation, which comprises transmitting, via the communication device, a command to affect an external device.

20. The computing system of claim 19 wherein the external device displays digital content.

21. The computing system of claim 17 further comprising a visualization engine stored in the memory, the visualization engine generating graphics in relation to the virtual environment configured for display.

22. The computing system of claim 17 further comprising a communication device able to receive position data about a physical object, wherein the virtual object corresponds to a physical object, and the processor is configured to update the virtual environment by moving the virtual object to a new position, the new position corresponding to the position data of the physical object.

23. The computing system of claim 17 wherein the interaction comprises the virtual object moving into the zone.

24. The computing system of claim 17 wherein the interaction comprises the virtual object leaving the zone.

25. A method for controlling zone interaction, comprising:
displaying a graphical user interface (GUI) that is in data access to a three-dimensional virtual environment, the GUI and the virtual environment residing on a computing system;
receiving input through the GUI to assign one or more zone attributes to a zone, wherein the zone attributes comprise a shape, one or more dimensions, and a position in the virtual environment; assign a virtual object to the zone, the virtual object residing in the virtual environment; assign an interaction between the virtual object and the zone for triggering an operation; and assign the operation to be executed responsive to detecting the interaction; and,
responsive to the computing system detecting the interaction between the virtual object and the zone, the computing system executing the operation.

26. The method of claim 25 further comprising the computing system updating a current position of the virtual object based on a current position of a physical object, and the virtual object corresponds to the physical object.

* * * * *